(12) United States Patent
Nashiki

(10) Patent No.: US 6,211,593 B1
(45) Date of Patent: Apr. 3, 2001

(54) SYNCHRONOUS MOTOR WITH PERMANENT MAGNET PROVIDED ON MAGNETIC POLE END

(75) Inventor: Masayuki Nashiki, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 09/425,201

(22) Filed: Oct. 22, 1999

(30) Foreign Application Priority Data

Oct. 28, 1998 (JP) .................................................. 10-307667

(51) Int. Cl.⁷ .................................................. H02K 21/14
(52) U.S. Cl. ........................... 310/156; 310/162; 310/114
(58) Field of Search .................................... 310/156, 216, 310/162, 166, 261, 114; 29/596–598

(56) References Cited

U.S. PATENT DOCUMENTS

| | | | |
|---|---|---|---|
| 4,339,874 | * 7/1982 | Mc'Carty et al. | 29/598 |
| 5,047,681 | * 9/1991 | Gaillard et al. | 310/156 |
| 5,378,953 | * 1/1995 | Uchida et al. | 310/156 |
| 5,604,390 | * 2/1997 | Ackermann | 310/156 |
| 5,841,212 | * 11/1998 | Mita et al. | 310/156 |
| 5,990,591 | * 11/1999 | Yamaguchi et al. | 310/156 |
| 6,025,667 | * 2/2000 | Narita et al. | 310/156 |
| 6,034,460 | * 3/2000 | Tajima et al. | 310/179 |

OTHER PUBLICATIONS

Wide Speed Control of Interior Permanent Magnet Synchronous Motor, T.IEE, Japan, vol. 114–D, No. 6, 1994 (pp. 668–673), Jun. 1994.

* cited by examiner

Primary Examiner—Tran Nguyen
(74) Attorney, Agent, or Firm—Oliff & Berridge PLC.

(57) ABSTRACT

A synchronous motor comprising permanent magnets (35, 41) with N poles arranged at ends of N magnetic poles of a rotor, permanent magnets (38, 34) with S poles arranged at ends of S magnetic poles of the rotor, magnetic pole portions (40) made of soft magnetic member at middle portion of the N magnetic poles of the rotor, and magnetic pole portions (39) made of soft magnetic member at middle portion of the S magnetic poles of the rotor. The synchronous motor has a structure in which the respective N and S magnetic poles are shifted in the rotor rotation direction relatively by NN/NR of a stator slot pitch, wherein NN and NR are integers equal to or less than the number of poles formed in the rotor.

9 Claims, 23 Drawing Sheets

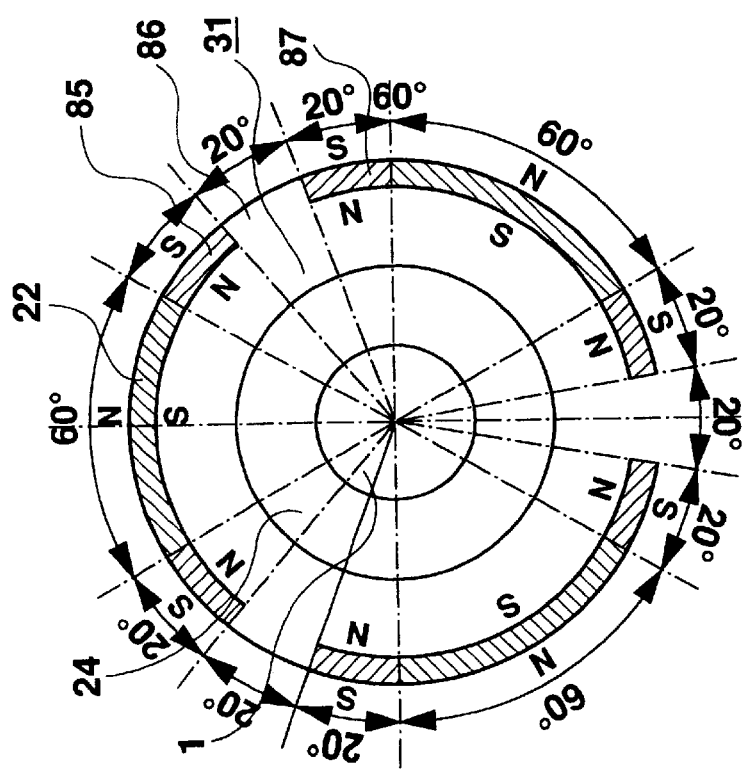
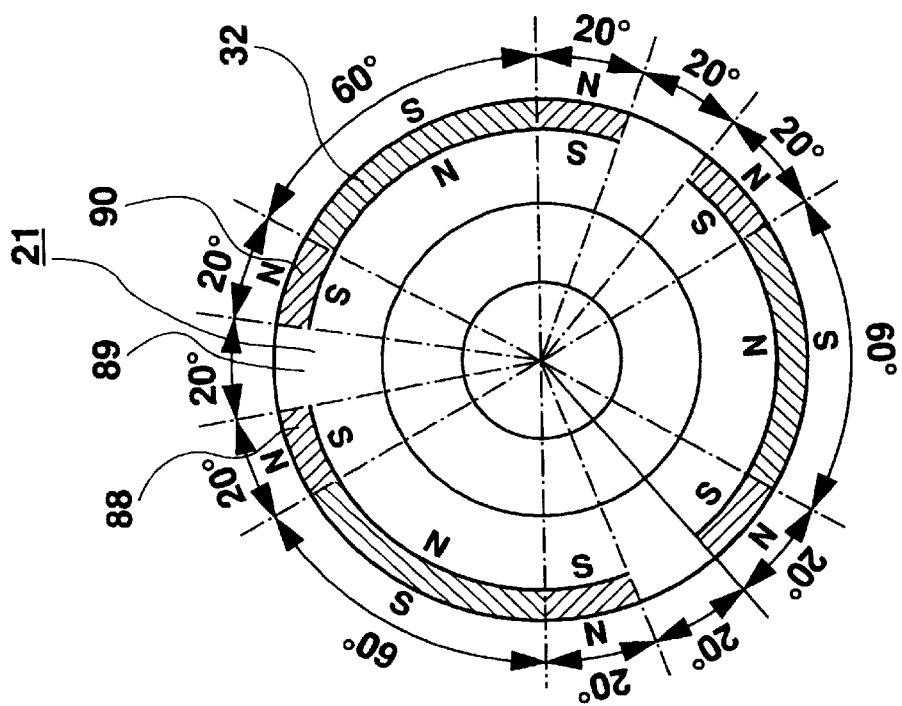
Fig. 25B
Fig. 25A

SYNCHRONOUS MOTOR WITH PERMANENT MAGNET PROVIDED ON MAGNETIC POLE END

BACKGROUND OF THE INVENTION

1. Field of the Invention

The present invention relates to a synchronous motor utilizing a permanent magnet.

2. Description of the Related Art

One type of conventional synchronous motor is a permanent magnetic synchronous motor such as shown in FIG. 1. Such a motor has a permanent magnet PM1 with a N pole arranged radially outward and a permanent magnet PM2 with a S pole arranged radially outward. The motor shown has a rotor shaft 1, a rotor yoke 2, and a stator (not shown) which is of a type commonly used in a three-phase induction motor, or the like.

A known example of the above conventional motor would be a permanent magnetic motor having an embedded magnet structure, such as is disclosed in such as is disclosed in Memoir D by Institute of Electrical Engineers of Japan, Vol. 114, Issue 6, 1994, pp. 668 to 673, "Wide Range Variable Speed Control for a PM Motor with Embedded Magnetic Structure", and so on.

FIG. 2 shows an example of a three-phase and six-pole synchronous reluctance motor, provided with a thin magnetic flux path 14 for magnetically connecting magnetic poles, and a slit 10, which is either a space or made of non-magnetic member, formed between the magnetic flux paths 14. The motor also has a rotor shaft 1, a rotor yoke 13, and a link 15 in a radial direction. The link 15 is not just unnecessary from a magnetic point of view, its presence can be harmful in light of an electromagnetic operation of the motor as leakage flux passes therethrough. Nevertheless, the link 15 is required to mechanically connect the rotor yoke 13 and each magnetic flux path 14 for structural reinforcement. The link 16 on the external circumference of the rotor similarly reinforces the rotor as entirety. The rotor has a structure in which flat rolled magnetic steel sheets and strips, each having the shape as shown in FIG. 2, are laminated in the direction of the rotor shaft. The stator 12 has slots where an three-phase six-pole AC winding passes.

Operation of the synchronous reluctance motor FIG. 2 will be described referring to FIG. 3, which shows a modeled two-pole synchronous reluctance motor, provided with thin magnetic flux paths NMP and slits SG. A magnetic flux path NMP is a path where magnetic flux passes from one magnetic pole to another. A slit SG is a space formed between adjacent thin magnetic flux paths NMP.

The rotor of FIG. 3 has a structure in which smaller magnetic resistance is caused in the vertical (d-axis) direction of the rotor and larger magnetic resistance is caused in the horizontal (q-axis) direction. A stator 7 is also shown in the drawing.

When the rotor is excited by magnetizing current id, N and S poles are formed as indicated in the figure, thereby creating a magnetic flux MFd. When a torque current iq is then supplied in the direction of the magnetic flux MFd, force F1 is caused. As the torque current iq additionally causes a magnetic flux MFq, force F2 is thus caused which is proportional to a product of the magnetizing current id and the magnetic flux MFq. As a result, the motor generates a rotation torque which is proportional to the force (F1–F2).

The above operation of FIG. 3 can be expressed using vectors, as shown in FIG. 4, in disregard of losses, such as winding resistance, leakage inductance, core loss, and soon, of the motor. Current i0, or an added current of the magnetizing current id and the torque current iq, is supplied to the motor. When the motor rotates at a rotation angle frequency $\omega$ with d-axis inductance Ld and q-axis inductance Lq, a voltage $Vd = -Lq \cdot diq/dt = -\omega Lq \cdot iq$ will be caused in the direction of the flow of magnetic current id, while a voltage $Vq = Ld \cdot did/dt = \omega \cdot Ld \cdot id$ will be caused in the direction of the flow of torque current iq. voltage V0 is an added voltage of the voltages Vd and Vq. Motor output power P is expressed as $P = \omega \cdot Ld \cdot id \cdot iq - \omega \cdot Lq \cdot iq \cdot id = \omega \cdot (Ld-Lq) \cdot id \cdot iq = v0 \cdot i0 \cdot \cos(\theta PR)$, in which $\theta PR$ is a phase difference between voltage V0 and current i0, and $\cos(\theta PR)$ is a power factor.

FIG. 5 is a longitudinal cross sectional view of a three-phase six-pole synchronous motor of a hybrid type which has a pair of motors using permanent magnets and a pair of field winding. FIG. 6A is a lateral cross section of the rotor of FIG. 5 along the line EF; FIG. 6B is a lateral cross section of the same along the line GH. A three-phase AC winding 28 passes through the respective stators ST1, ST2 (25, 26) of the two respective motors, winding thereabout in the same manner as a three-phase AC winding of a typical three-phase inductance motor does. A field winding 29 winds around the stator in the rotor rotation direction, and excites the magnetic flux, passing through the stators and rotors as indicated by the arrow 30, of a magnetic field. A rotor shaft 1 is also shown in the drawing. A permanent magnet 22 constitutes a N pole of the rotor RT1 on the left side. Three permanent magnets 22 are provided each for every electrical angle of 360° in the rotor rotation direction. The rotor RT1 has a magnetic flux path 23. A permanent magnet 32 constitutes a S pole of the rotor RT2 on the right side. Three permanent magnets 32 are provided for every electrical angle of 360° in the rotor rotation direction at a position differing from that of each permanent magnet 22 by an electrical angle of 180° in the rotor rotation direction. Back yokes 24 and 27 on the rotor and stator sides, respectively, induce magnetic flux in the direction of the rotor shaft.

Magnetic flux in the magnetic poles 31, 21, which are made of soft magnetic material, varies due to the current flowing in the field winding 29. Specifically, when the magnetizing current IFS for the field winding 29 is zero (IFS=0), the magnetic flux is not excited on the magnetic poles 31, 21, and instead is formed between the permanent magnets 22 and 32. When the magnetizing current IFS is negative, provided that a magnetic flux is caused in the direction with the arrow 30, the magnetic pole 31 is rendered to be a N pole, while the magnetic pole 21 is rendered to be a S pole. The magnitude of the magnetic flux is proportional to that of the field magnetizing current IFS. When the magnetizing current IFS is positive, field magnetic flux is caused in the direction opposite from that with the arrow 30. As a result, the magnetic pole 31 is rendered a S pole, while the magnetic pole 21 is rendered a N pole. The magnitude of the magnetic flux is proportional to that of the field magnetizing current IFS. When the magnetizing current IFS is positive, respective magnetic poles of the rotor RT1 and of the rotor RT2 are alternately rendered to be N and S poles in the rotor rotation direction, and the motor resultantly functions like a permanent magnet synchronous motor, as shown in FIG. 1. When the magnetizing current IFS is negative, on the other hand, the magnetic poles of the rotor RT1 all serve as a N pole, so that a difference in magnetic flux between the magnetic poles 22 and 31 resultantly serves as a function of the motor, producing an effect similar to flux-weakening. Meanwhile, the respective magnetic poles of the rotor RT2 all serve as a S pole, so that a difference in magnetic flux between the magnetic poles 32 and 21 resultantly serves as a function of the motor, achieving an effect similar to flux-weakening. As described above, by controlling the magnetizing current IFS by varying in a range between positive and negative, effective magnetic flux of a magnetic field can be strengthened or weakened. This enables rotation frequency control of the synchronous motor in a wider range.

Although permanent magnet synchronous motors such as shown in FIG. 1 are widely used because of their easiness of torque control, they have a problem of incapability of constant power control through flux-weakening control when it rotates at base rotation frequency or larger rotation frequency as magnetic field is substantially fixed due to the permanent magnet property, ruling out application of flux-weakening control.

Although a permanent magnet motor with an embedded magnet is capable of flux-weakening control by invertedly exciting a magnetic field flux, it has a problem of deteriorated efficiency in light load driving at high speed rotation as the motor always requires large current for flux-weakening control. The motor has another problem that it requires a safety device to separate a motor and a control circuit for safety at the time of emergency, such as power failure, occurring during high speed rotation as flux-weakening control cannot then be applied and the motor thus generates large voltage.

A synchronous reluctance motor, as shown in FIGS. 2 and 3, also has a problem that, due to generation of magnetic flux MFq by torque current iq, a force F2 proportional to a product of the magnetizing current id and magnetic flux MFq is caused in a direction opposite from that of an output torque, and motor power is thus deteriorated. The deterioration leads to deteriorated motor efficiency and power factor.

A synchronous motor of hybrid exciting type, as shown in FIG. 5, is capable of substantially ideal field control with a small torque current. However, in actuality, reaction of an armature will increase when a torque current is supplied, and magnetic flux distribution in the magnetic poles 31 and 21 is thereby distracted in the rotation direction, compared to a case of a torque current being zero. In particular, when the motor rotates at a high speed, such as at base rotation frequency or larger rotation frequency, unfavorable drop in torque generation and/or unfavorable increase in terminal voltage of the synchronous motor may be caused.

SUMMARY OF THE INVENTION

According to one aspect of the present invention, there is provided a synchronous motor, comprising a permanent magnet PMN arranged at one or more ends in a rotation direction of a N magnetic pole of a rotor having a N pole thereof arranged radially outward; a permanent magnet PMS arranged at one or more ends in the rotation direction of a S magnetic pole of the rotor having a S pole thereof arranged radially outward; a magnetic pole portion PN made of soft magnetic member arranged in a middle portion in the rotation direction of the N magnetic pole of the rotor; and a magnetic pole portion PS made of soft magnetic member, arranged in a middle portion in the rotation direction, of the S pole magnetic pole of the rotor.

The above synchronous motor may further comprise stator having a plurality of teeth; and a plurality of windings winding around the respective plurality of teeth, being supplied with sine wave currents having respective phases, wherein around one or more teeth is two or more windings, the sine wave currents having respective phases and being supplied to the plurality of windings cause a current vector, a phase of the current vector matches a position in a rotor rotation direction of an associated slot, and the number windings around the one or more teeth is decided such that an amplitude of a product of the number of winding times and the sine wave current being supplied to the windings are the same with respect to all of the plurality of teeth.

The synchronous motor of the present invention may also be configured so as to additionally comprise a stator having a plurality of teeth around which are wound windings in a different number of times for every phase, and wherein an interval between adjacent teeth of the stator is determined substantially proportional to a current maximum value, which is a magnitude of a current vector caused by sine wave currents having respective phases when being supplied to the windings.

The above synchronous motor may also be configured so as to comprise a stator having a plurality of teeth, wherein the rotor includes magnetic poles whose two respective adjacent ends are shifted by different shift angles in the rotation direction.

That is, the rotor has a plurality of magnetic poles, and the magnetic poles are positioned in the rotor rotation direction shifted by NN/NR of one stator slot pitch from respective equidistant positions in the rotor rotation direction, wherein NN is an integer determined for every magnetic pole, and NR is an integer, unique to the rotor, indicative of the type of shifting the rotor magnetic pole in the rotor rotation direction.

In another aspect of the present invention, the rotor of the above synchronous motor is virtually divided into function blocks for every electric angle, and the synchronous motor further comprises a stator having a plurality of teeth so that the windings wind around the circumference thereof, at least one of the plurality of teeth is divided at a predetermined ratio, and the divided pieces of the tooth are arranged at both ends in the rotation direction of the function blocks at an interval of a multiple of the electric angle of the rotor.

That is, in a multi-phase synchronous motor having a plurality of slots for windings formed along the circumference of the stator, provided that NPP number of magnetic poles are formed in the stator, the stator is functionally divided into NPP1 in the rotor rotation direction, and the divided stator functional blocks are shifted in the rotor rotation direction by NPP2/NPP1 of one stator slot pitch from respective equidistant positions in the rotor rotation direction, wherein NPP1 is a number equal to or less than NPP, and NPP2 is an integer.

The above synchronous motor may further comprise a magnetic insulating portion in the form of a slit or the like made of a space layer or a magnetic insulating member provided in the vicinity of the magnetic pole portion made of soft magnetic member.

Because of the inclusion of this member, it is made almost impossible for a magnetic flux to exist in a direction perpendicular to a magnetic flux of the magnetic pole.

The above synchronous motor may further comprise a magnetic insulating portion in the form of a slit or the like made of a space layer or a magnetic insulating member provided between magnetic pole portions made of soft magnetic member, a link connected traversing the magnetic insulating portion, and a permanent magnet arranged in a vicinity of the link whereby the permanent magnet supplies magnetic flux to the link.

The above synchronous motor may also be configured so as to comprise d-axis current control means for controlling a d-axis current, which is a magnetizing current for exciting a field, such that, at least when maximum torque control is carried out at respective rotation velocities VEL, the d-axis current becomes substantially constant with respect to rotation velocity from zero to base rotation frequency, and, the d-axis current becomes substantially (Kf1/VEL−KPF) with respect to rotation velocity equal to or higher than the base rotation frequency. Note that Kf1 is a constant unique to the synchronous motor and relating to a number of windings for the stator and to a field magnetic flux, and KPF is a constant unique to the synchronous motor and to permanent magnets PMN and PMS.

According to another aspect of the present invention, there is provided a synchronous motor having a pair of stators, a pair of rotors, and a field winding, wherein one rotor comprises a permanent magnet with a N pole arranged radially outward, provided for every electric angle of 360° in a rotation direction of a magnetic pole of the rotor, a permanent magnet with an S pole arranged radially outward, provided at an end in the rotation direction, of a S magnetic pole, and a magnetic pole portion made of soft magnetic member provided at a middle portion in the rotation direction, of the S magnetic pole, and the second rotor comprises a permanent magnet with a S pole arranged radially outward, provided at an end in the rotation direction, of a magnetic pole which is shifted by an electric angle 180 from the permanent magnet with a N pole arranged radially outward of the one rotor, a permanent magnet with a N pole arranged radially outward, provided at an end in the rotation direction, of a N magnetic pole, and a magnetic pole portion made of soft magnetic member, provided at a middle portion in the rotation direction of the N magnetic pole.

According to the present invention, the middle portion in the rotor rotation direction of each rotor magnetic pole of a synchronous motor is made of soft magnetic pole so that flux-weakening control can be applied. A permanent magnet is provided on the magnetic pole surface in the q-axis direction according to the polarity of the magnetic pole so that a torque current, or a q-axis current, may less likely vary a field magnetic flux.

As, with the above configuration, the magnetic flux distributions on the surfaces of the respective magnetic poles become significantly different from a sine wave distribution, or an ideal distribution, due to the above-described permanent magnet arrangement according to the present invention, torque ripples will be increased. In order to solve this problem, windings with respective phases are arranged so as to pass through the respective slots to wind around associated teeth such that the amplitude of a product of the number of times at which the winding passes through each slot and the multi-phase sinusoidal current being supplied to the winding in each slot, is substantially the same among all slots, and that an electric vector for each slot has a phase substantially matching with each slot position in the rotor rotation direction.

Another method for preventing increasing torque ripples is formation of a stator having a structure in which an interval between adjacent teeth of the stator has a dimension determined proportional to the magnitude of an current vector formed by a current flowing in the windings passing through the associated slot, i.e., the maximum current value. Still another method is formation of a stator having a structure in which, provided that NPP number of magnetic poles are formed in the stator, the stator is functionally divided into NPP1 number of functional blocks in the rotor rotation direction, and the divided stator functional blocks are shifted by NPP2/NPP1 of one stator slot pitch in the rotor rotation direction from respective equidistant positions in the rotor rotation direction, wherein NPP1 is a number equal to or less than NPP, and NPP2 is an integer.

A method for reducing torque ripples due to discrete arrangement of slots in the stator is formation of a rotor having a plurality of magnetic poles positioned in the rotor rotation direction shifted by NN/NR of one stator slot pitch in the rotor rotation direction from respective equidistant positions in the rotor rotation direction. Here, NN is an integer determined for every magnetic pole, and two or more numbers of values are set for every rotor. NR is an integer, unique to the rotor, indicative of the type of shifting the rotor magnetic pole in the rotor rotation direction, and one value is set for every motor with the maximum value being the number of magnetic poles of the rotor.

In order to reduce disturbance in the magnetic flux distribution of the rotor due to a q-axis current iq, a diaphragm, such as a slit, with large magnetic reluctance is provided in the soft magnetic portion of the rotor.

As provision of a magnetic diaphragm, such as a slit, causes to weaken mechanical strength of the rotor, a link is provided to in the place of the slit or the like and a permanent magnet is moreover provided in the vicinity of the link to magnetically saturate the link. With this arrangement, leakage magnetic flux from the link is reduced, preventing deterioration of properties of motor due to leakage magnetic flux.

Field magnetizing current, or d-axis current, is controlled such that the current is substantially constant with respect to rotation velocity from zero to the base rotation frequency, and to be substantially equal to (Kf1/VEL−KPF) with respect to rotation velocity equal to or more than the base rotation frequency, wherein Kf1 is a constant unique to a synchronous rotor and to relating to the number of windings for the stator and a field magnetic flux, and KPF is a constant unique to a synchronous motor and relating to the permanent magnets PMN and PMS.

A synchronous motor having one pair of stators ST1, ST2, one pair of rotors RT1, RT2, and a field winding between the stators and rotors, comprises a N pole permanent magnet HBN provided for every electric angle 360° in a magnetic pole of the rotor RT1, a S pole permanent magnet BPMS provided at an end of the S magnetic pole of the rotor RT1, a magnetic pole portion HBPS made of soft magnetic member arranged in the middle portion of the S magnetic pole of the rotor RT1, a S pole permanent magnet HBS provided to the rotor RT2 at a position shifted by an electric angle of 180° in the rotation direction from the N pole permanent magnet HBS provided in the rotor RT1, a N pole permanent magnet HBPMN provided at an end of the N magnetic pole of the rotor RT2, and a magnetic pole portion HBPN made of soft magnetic member arranged in the middle portion of the N magnetic pole of the rotor RT2. By controlling the magnetizing current IFS being supplied to the field winding in a range between positive and negative, an effective magnetic flux of a field is strengthen or weakened, adverse effects of the torque current is reduced, and driving control can be achieved in a wide, stabilized rotation frequency control range.

BRIEF DESCRIPTION OF THE DRAWINGS

The above and other objects, features, and advantages of the present invention will become further apparent from the following description of the preferred embodiment taken in conjunction with the accompanying drawings wherein:

FIG. 25A is a diagram for explaining major elements of a rotor structure of a synchronous motor according to the present invention; and FIG. 25B is a diagram for explaining major elements of a rotor structure of a synchronous motor according to the present invention.

DESCRIPTION OF THE PREFERRED EMBODIMENTS

Figure 7:
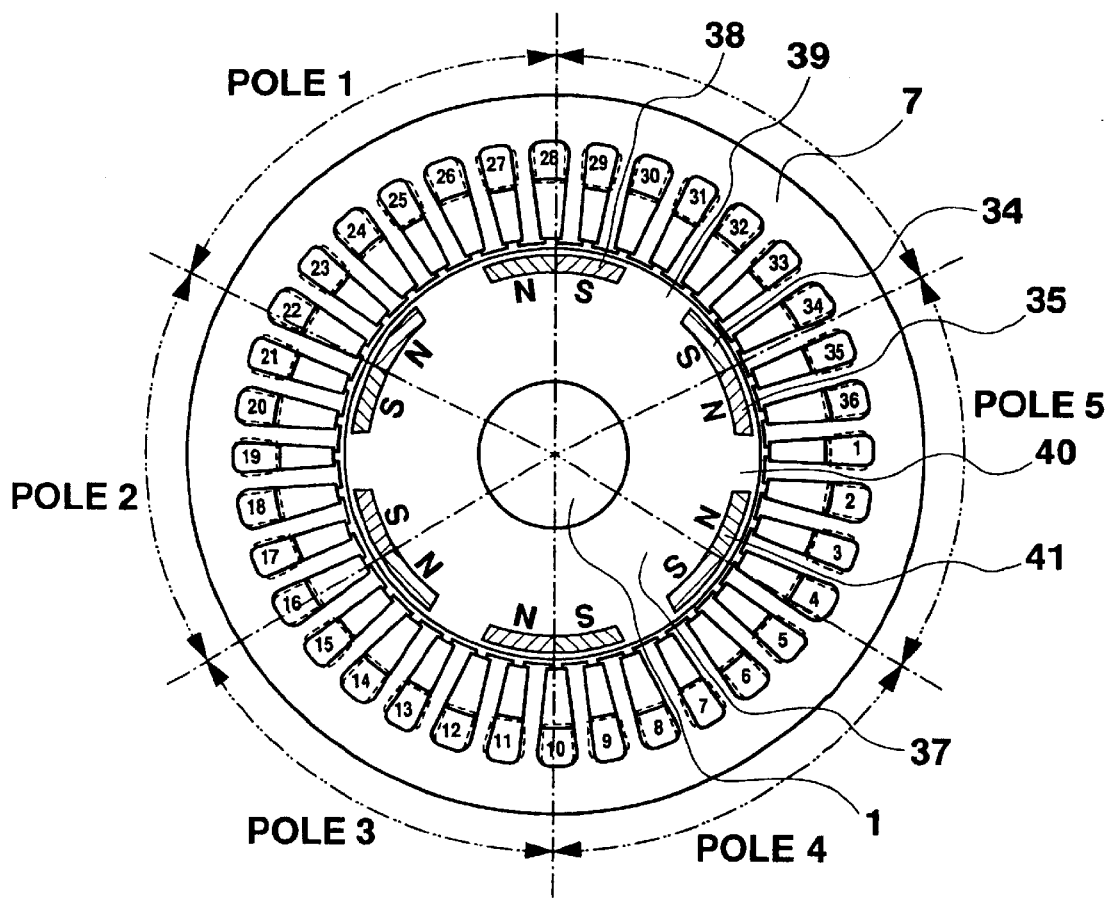
FIG. 7 is a cross sectional diagram showing major elements of a preferred embodiment of a synchronous motor according to the present invention.

FIG. 7 is a cross sectional diagram showing a preferred embodiment of the present invention in the form of a three-phase six-pole synchronous motor. Respective magnetic poles of the rotor are denoted as pole 1, pole 2, pole 3, pole 4, pole 5, and pole 6. At both ends of the pole 5, i.e., at the boundaries between poles 4 and 5, and 5 and 6, permanent magnets 35, 41 are respectively provided with a N pole arranged radially outward. The middle portion 40 of the pole 5 is made of soft magnetic material, which comprises flat rolled magnetic steel sheets and strips laminated in the direction of rotor shaft 1. At both ends of the pole 6, i.e., at the boundaries between poles 5 and 6, and 6 and 1, permanent magnets 34, 38 are respectively provided with a S pole arranged radially outward. The middle portion 39 of the pole 6 is made of soft magnetic material. The stator 7 has a structure similar to that of a typical inductance motor or the like.

Figure 8:
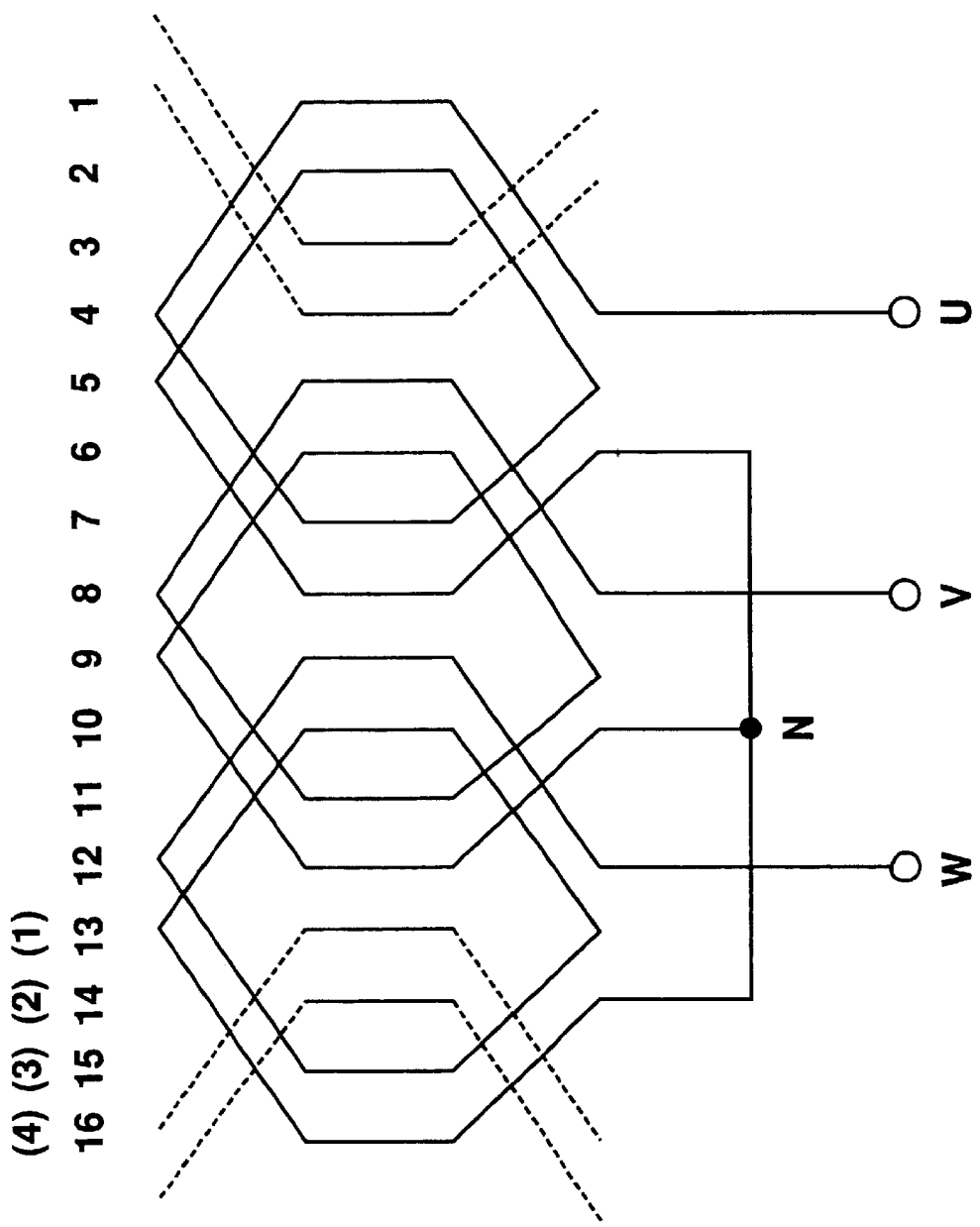
FIG. 8 is a cross sectional diagram showing an example of a full pitch winding for a synchronous motor.

FIG. 8 shows an example of a winding passing through the slots 1 to 36, in which U, V, W represent three phase AC terminals of a synchronous motor, N is a neutral point of a star connection, and a winding is a full-pitch winding.

Magnetic operation of the synchronous motor of FIG. 7 will be described referring to FIG. 9, which shows a modeled two-pole synchronous motor. A winding current for the stator is shown modeled as d-axis current 44, 45, or field magnetizing current, and also as q-axis current 42, 43, or a torque current. Permanent magnets 46, 47 with a N pole arranged radially outward and a magnetic pole portion 48 of the soft magnetic material together constitute a N pole of the rotor, while permanent magnets 49, 50 with a S pole arranged radially outward and a magnetic pole portion 51 of the soft magnetic material together constitute a S pole.

Figure 1:
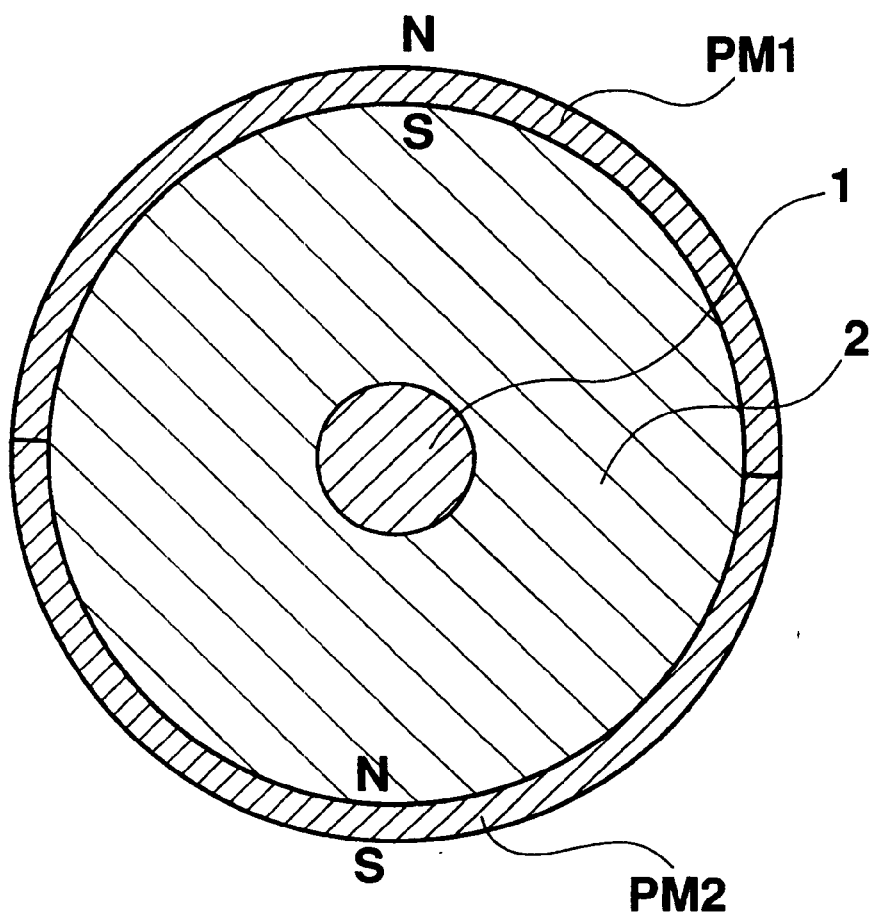
FIG. 1 is a diagram showing a rotor of a conventional permanent magnet synchronous motor.
Figure 3:
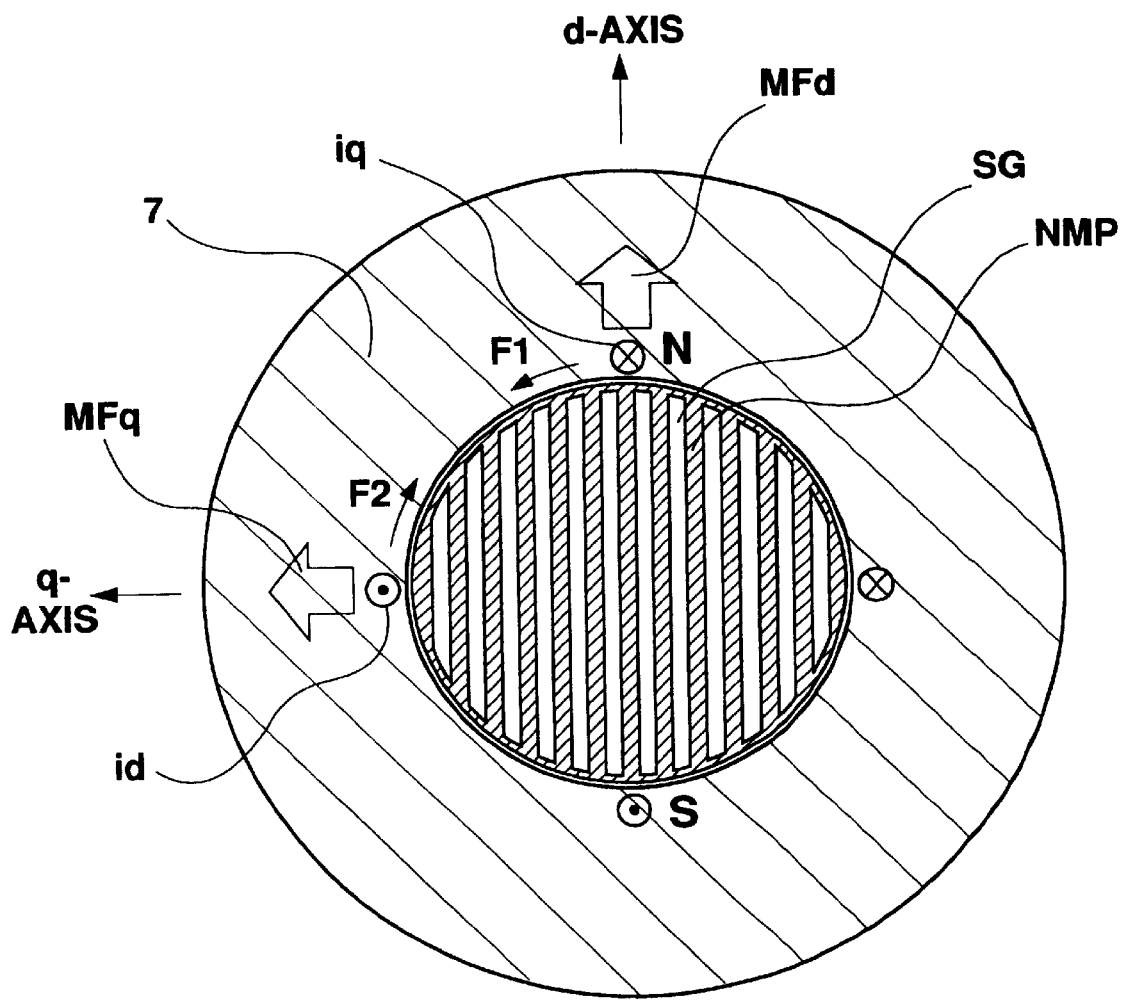
FIG. 3 is a diagram modeling the two-pole motor of FIG. 2.

Magnetic fluxes 53, 54 passing through the respective permanent magnets are screened by the respective permanent magnets and thus weakened. Magnetic fluxes 55, 56, 57, 58 passing through the magnetic poles 48, 51 made of soft magnetic material are excited by d-axis current 44, 45. With the above, condition has been created which is equivalent to that created by a permanent magnetic motor, shown in FIG. 1, and also similar to that created by a synchronous reluctance motor, shown in FIG. 3. When a torque current, or q-axis current 42, 43, is supplied under the above condition, magnetic flux due to magnetomotive force caused by the q-axis current is to be increased in the q-axis direction. However, due to the presence of the permanent magnets 46, 47, 49, 50 in the q-axis direction, the magnetic flux may vary only slightly in the q-axis direction. Therefore, torque reduction due to magnetic flux components in the q-axis direction is made small.

Figure 4:
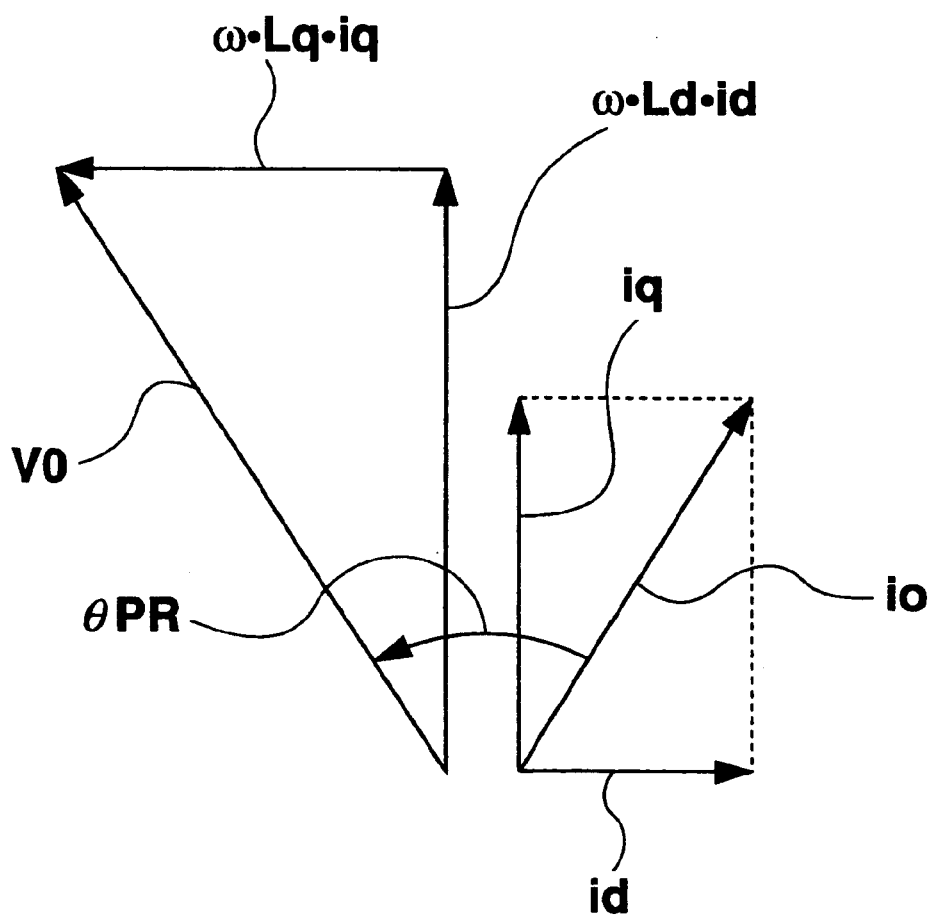
FIG. 4 is a vector diagram of the current and voltage of the motor of FIG. 3.

Provision of a slit 52 (indicated by the broken line) will be advantageous. As a slit 52 is a space or made of a material with large magnetic resistance, large magnetic resistance will be caused in the direction perpendicular to the slit, which can effectively prevent passage of magnetic flux component in the q-axis direction. One or more slits may be provided. The number of slits may be determined in view of easiness of manufacturing and improvement of properties of the motor. A slit 52E may be provided between the permanent magnets 47 and 50 and the magnetic poles 48 and 51 to magnetically separate them. Note that the permanent magnet 47 is provided with a N pole on the external side of the rotor, while the permanent magnet 50 is provided with a S pole on the external side. Also note that the magnetic poles 48 and 51 are made of soft magnetic material. When the slit 52E is made wider, properties of the magnetic poles with a permanent magnet arranged therein and that with soft magnetic material only can be more effectively combined. Specifically, referring to a vector diagram of FIG. 4, even through a voltage Vd=−Lq·diq/dt=−ω·Lq·iq is generated in the direction with the flow of magnetizing current id, a vector (ω·Lq·Lq) can be made small because Lq is small as variation in magnetic flux in the q-axis direction has been weakened by the permanent magnet. Meanwhile, as output power of the motor is expressed as P=ω·Ld·id·iq−ω·Lq·iq·id=ω·(Ld−Lq)·id·iq=v0·i0·COS(θPR) and the second term thereof is a small value, large torque and output can be obtained. At the same time, as a phase difference, or θPR, between voltage V0 and current i0, can be reduced, power factor COS(θPR), as well as driving efficiency of the control device of a synchronous motor, can be improved.

Next, flux-weakening control in rotation control at high speed rotation, such as at base rotation frequency or higher rotation frequency, will be described.

Figure 9:
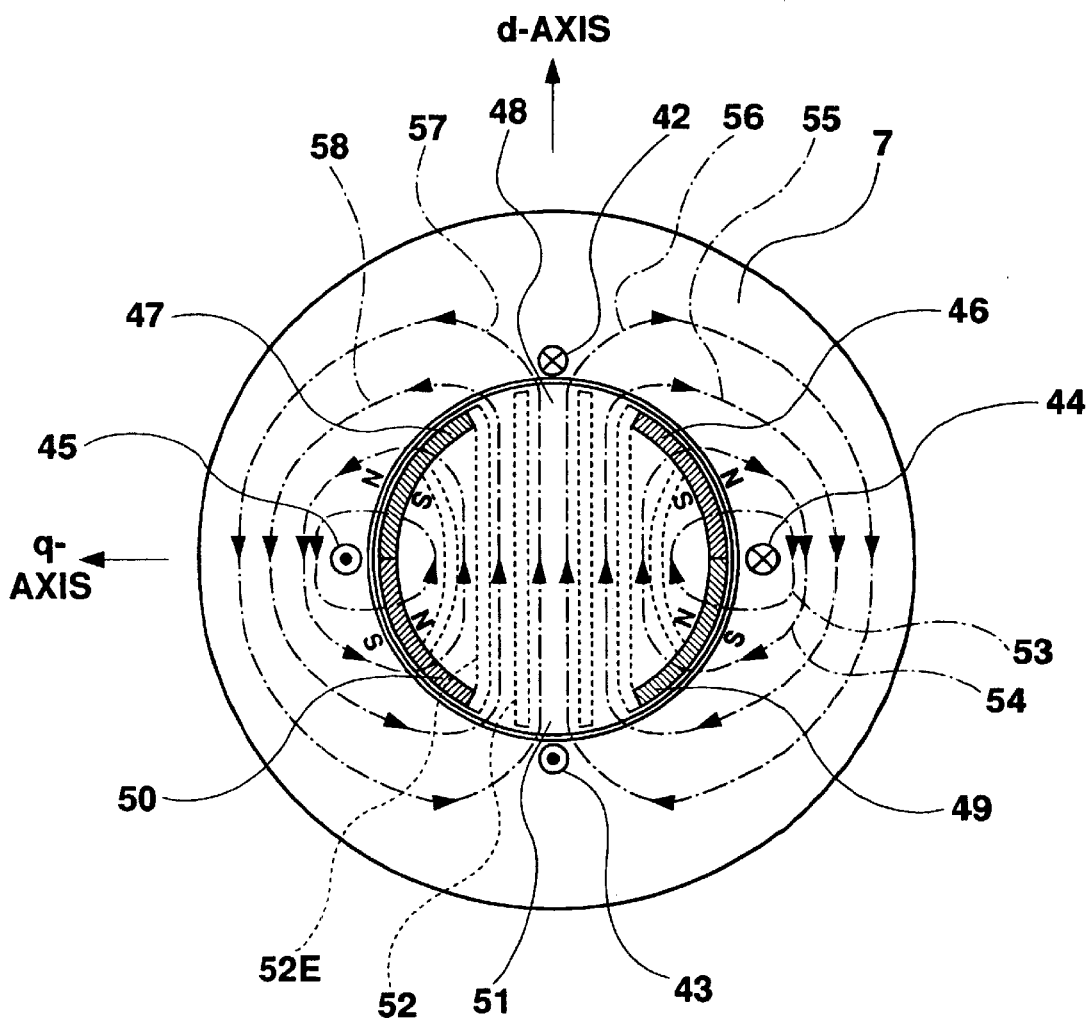
FIG. 9 is a diagram showing distribution of magnetic flux with a synchronous motor modeled to have two poles according to the present invention.
Figure 10:
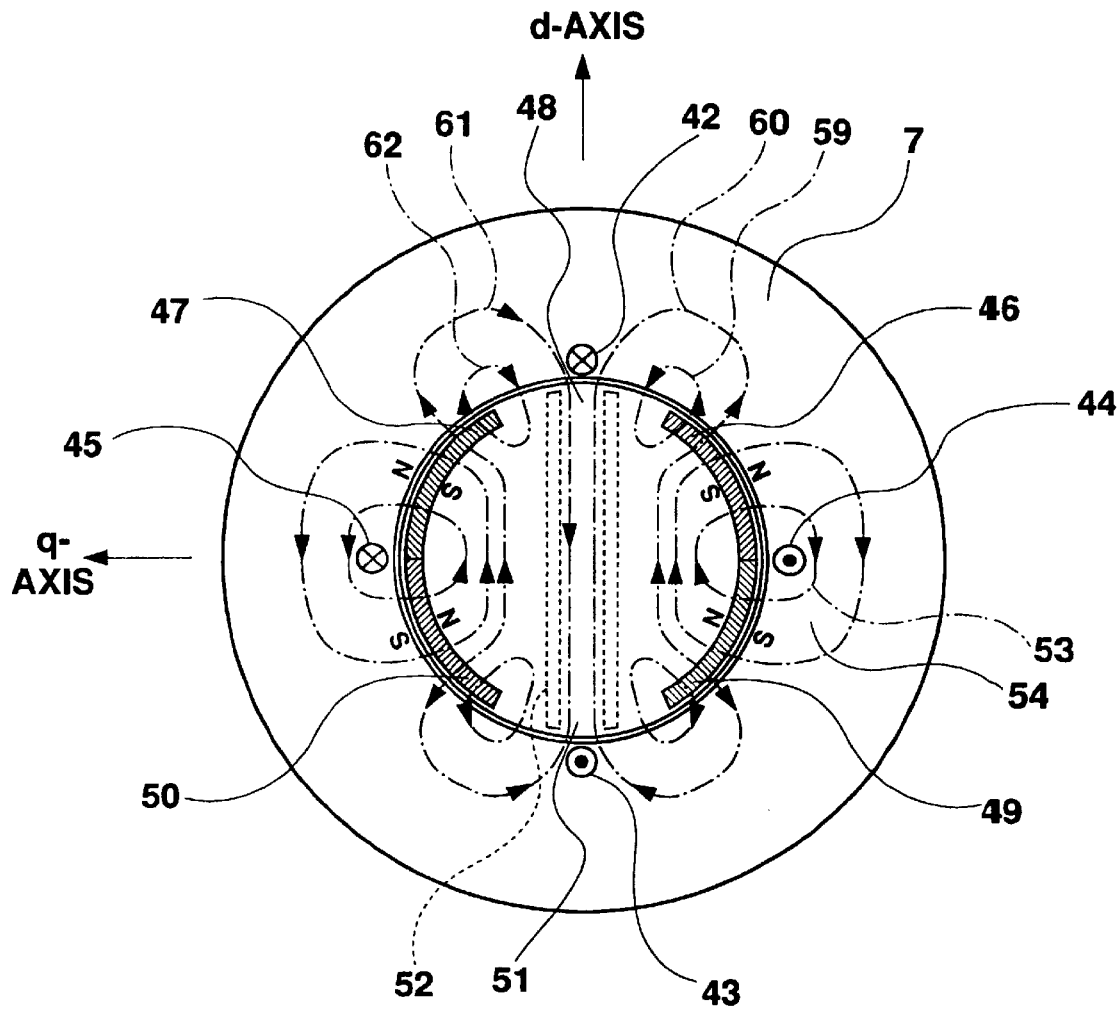
FIG. 10 is a diagram showing distribution of magnetic flux with a synchronous motor modeled to have two poles according to the present invention when invertedly excited.

Referring to FIG. 9, when d-axis current 44, 45 is gradually reduced, magnetic flux in the magnetic pole portions 48, 51 will also gradually be reduced, and magnetic flux passing through the N pole constituted of the permanent magnets 46, 47 and the magnetic pole portion 48 will also be accordingly reduced to thereby achieve flux-weakening. When the d-axis current 44, 45 is set substantially zero, magnetic flux in the magnetic pole portions 48, 51 made of soft magnetic member becomes also substantially zero, as a result of which magnetic flux 53, 54 due to the permanent magnets is solely left effective. Further, when negative d-axis current 44, 45 is supplied, polarity of the magnetic flux 59, 60, 61, 62 in the magnetic poles 48, 51 is inverted, as shown in FIG. 10, so that magnetic flux passing through the N magnetic poles 46, 47, 48 can be further reduced. As described above, when d-axis current 44, 45 is controlled by varying in a range between positive and negative, magnetic flux can be desirably controlled. What is then important in flux-weakening control is provision of permanent magnets 46, 47, 49, 50 so that field magnetic flux caused by the d-axis current 44, 45, or magnetizing current id, can remain less susceptible to the torque current, or q-axis current 42, 43. These permanent magnets contribute stabilization of magnetic flux linking with the magnetizing current id.

It should be noted that magnetic flux in the q-axis direction is harmful particularly in a flux-weakening region at high speed rotation. In this sense, provision of a slit 52, which is effective in reducing magnetic flux in the q-axis direction, is particularly effective in the flux-weakening region.

The torque, generated in a counter-clockwise direction CCW in FIGS. 9 and 10, may also be generated in a clockwise direction by supplying negative q-axis current.

It should be noted that the permanent magnet may be divided into a plurality of magnet pieces to be separately arranged. The permanent magnets 46, 47, 49, 50 may be combination of rare earth magnet, which is high performance characteristics but expensive, and ferrite magnet, which is relatively inexpensive. Importantly, magnetomotive force of the permanent magnet must be secured so as to leave the rotor less susceptible to the q-axis current. Furthermore, magnetic flux need not be intense near the boundary portions between magnetic poles in view of motor torque. Thus, a recess, for example, formed on the rotor external circumferential surface in the vicinity of the magnetic pole boundaries may not be a problem.

The permanent magnets shown in FIGS. 7, 9, 10, which are provided in the inside of the flat rolled magnetic steel sheets and strips for mechanical holding, may instead be fixedly held via adhesive agent on the rotor surface.

In usage which requires generation of torque in only a single direction, the number of permanent magnets to be provided may be reduced without causing significant deterioration of the property of the motor. For example, referring to FIG. 9, the permanent magnets 47, 49 may be omitted. With this omission, the influence of the magnetomotive force of the q-axis current 42, 43 can be reduced by the permanent magnets 46, 50. Therefore, reduction of motor torque due to the d-axis current 44, 45 can be reduced.

Next, a control device for controlling the rotation velocity of a synchronous motor of FIG. 7 will be described.

Figure 11:
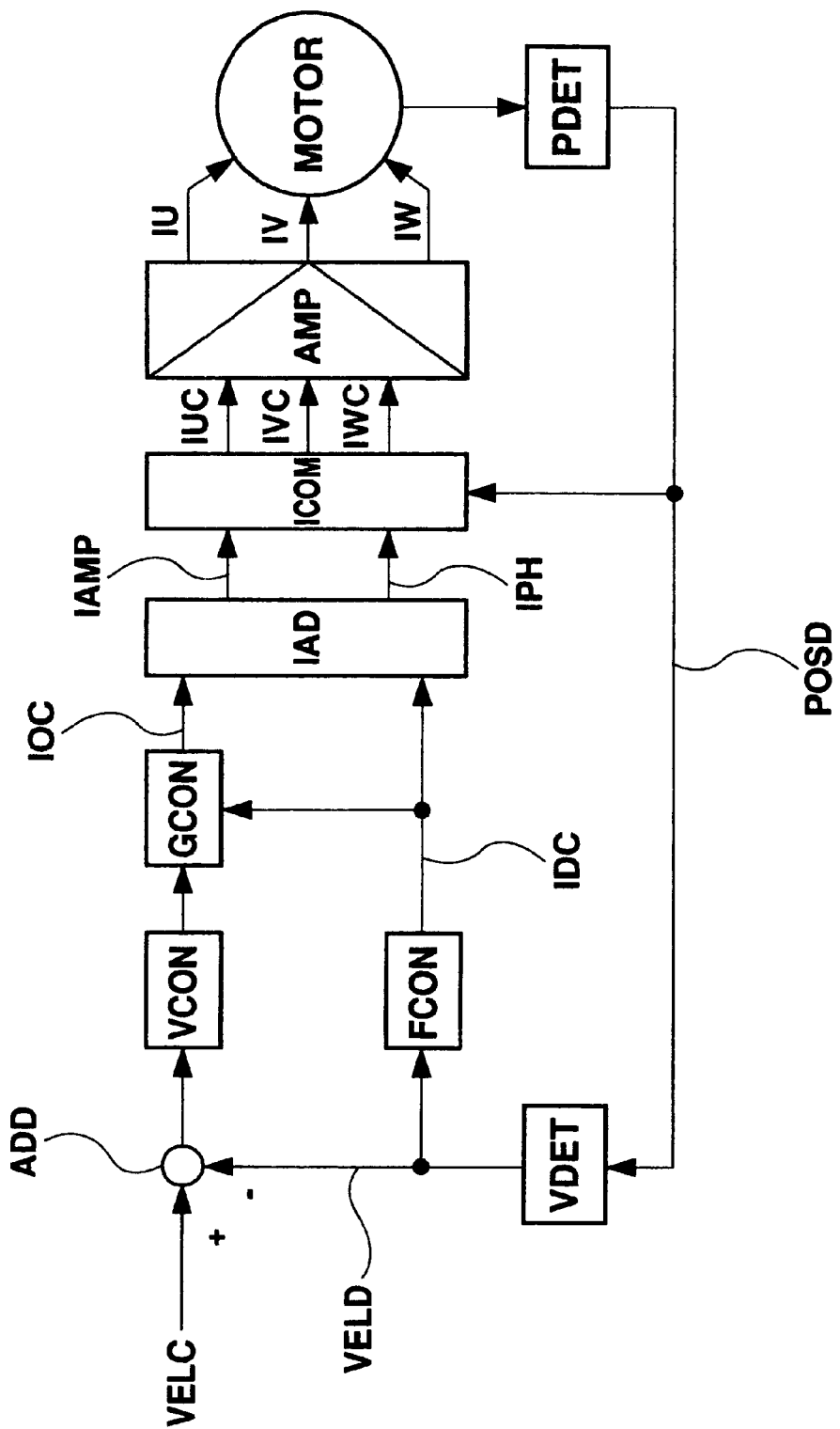
FIG. 11 is a block diagram showing a preferred embodiment of a control device of a synchronous motor according to the present invention.

FIG. 11 is a block diagram showing a control device comprising a position detection means PDET for detecting a rotation position POSD of a synchronous motor MOTOR, and a velocity detection means for detecting a velocity signal VELD. A difference between a velocity command VELC and a velocity signal VELD is obtained by a subtracter ADD, whose output is supplied to a velocity controller VCON. The velocity controller VCON supplies an output, or a torque command, to a gain controller GCON.

Figure 12:
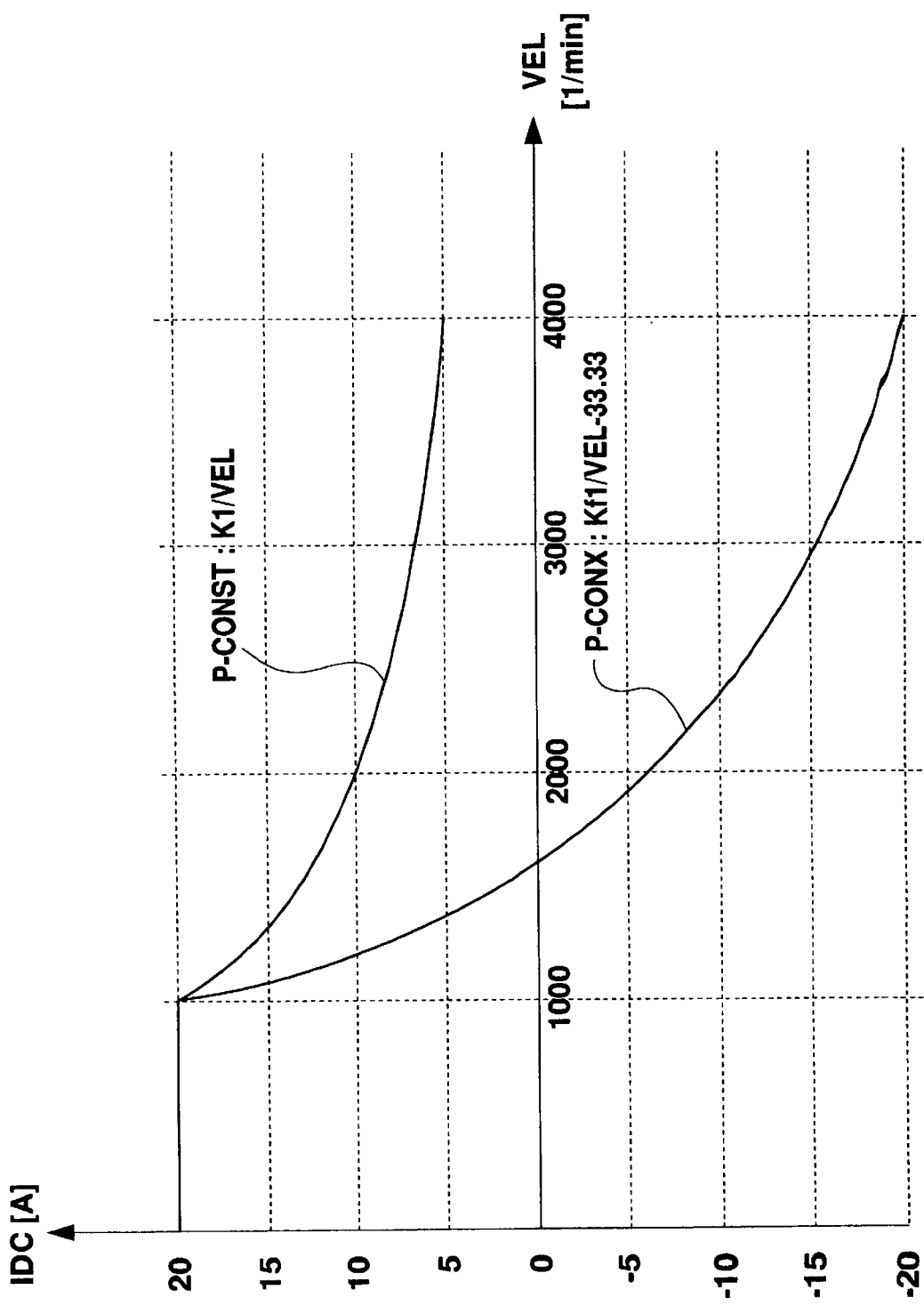
FIG. 12 is a diagram showing properties in controlling current components for a field of a synchronous motor according to the present invention.

Meanwhile, a magnetizing current, or a d-axis current, for controlling field magnetic flux is controlled by a field control means FCON. FIG. 12 shows input/output properties of the field control means FCON, in which the lateral axis corresponds to rotation velocity VEL [1/min] and the vertical axis corresponds to field current commands IDC. For example, in the case of an inductance motor, or the like, with base rotation frequency 1000 [1/min] and the maximum field magnetizing current 20 [A], field current for the motor is controlled such that a field current command is 20 [A] with respect to the rotation velocity VEL 0 to 1000 [1/min], and is equal to an inverse function (Kf/VEL) of rotation velocity with respect to the rotation velocity VEL 1000 [1/min] or over, as shown in FIG. 12, wherein Kf is a constant. This is because the motor voltage is kept equal to or less than a predetermined value while the above magnetic flux control is carried out, even when the motor rotates at a high velocity as the power source of a control device of the motor is controlled using a limited voltage, such as three-phase AC of 200 [V]. As motor voltage is generally proportional to a product of a field magnetic flux and a rotation velocity, a field current command IDC must be controlled so as to be an inverse of a rotation velocity when the rotor rotates at rotation velocity equal to or higher than the base rotation velocity. Note that the property is an ideal one in disregard of winding resistance of a motor, leakage inductance of respective windings, and non-linearity. Therefore, in actuality, the above control must be carried out in accordance with property which reflects those resistance.

As a synchronous motor of the present invention has a permanent magnet, field current thereof must be controlled differently from the property P-CONST shown in FIG. 12. Provide that a synchronous motor is designed such that a field current command IDC is 20[A] for base rotation frequency 1000 [1/min], and −20[A] for maximum rotation frequency 4000 [1/min]. Similar to the property P-CONST, flux-weakening control is carried out in a constant power control region as follows.

$$(\theta 0+\theta X)\cdot VEL=KP2 \qquad (1)$$

$$(\theta 0+\theta X)(\theta 0-\theta X)=1000/4000$$

therefore $\theta 0=5/3\cdot \theta XMAX$ wherein θ0 is a magnetic flux due to a permanent magnet, θX is a field magnetic flux due to a field current command IDC, KP2 is a constant, θXMAX is an increased magnetic flux θX due to a field current with maximum field current command IDC, or 20 [A]. Therefore, while the rotor rotates at rotation frequency equal to or less than base rotation frequency, at which magnetic flux in respective magnetic poles are maximized, ⅝ of the all effective magnetic fluxes in the respective magnetic poles stems from the permanent magnet, leaving ⅜ thereof being the maximum magnetic flux θXMAX, excited with the field current command IDC.

When magnetic flux θX is expressed using a product of a field current command IDC and a magnetic flux coefficient KθX, $$(5/3\cdot\theta XMAX+IDC\cdot K\theta X)\cdot VEL=KP2$$

$$(5/3\cdot 20{\mathit{19}}\ K\theta X+IDC\cdot K\theta X)\cdot VEL=KP2$$

therefore $IDC=(KP2/K\theta X)/VEL-33.33 \qquad (2)$ is obtained from the above expression (1). Because of passing through a point where IDC=20 and VEL=1000, a constant value Kf1=KP2/KθX=53333 is obtained. By controlling a field current command IDC according to the expression (2), which expresses the property P-CONX of FIG. 12, constant power control can be applied to a synchronous motor of the present invention through flux-weakening control. Note that leakage magnetic flux component, winding resistance, and so on, are disregarded. Also note that the property P-CONST has some freedom depending on the design of a synchronous motor. For example, when driving efficiency must be increased with a motor having light load in a high speed rotation region, narrower permanent magnets 38, 34, 35, 41 of FIG. 7 should be employed to achieve a design which enables a field current command IDC having a small absolute value at maximum rotation. Note that a field current command IDC is not necessarily controlled according to the property of FIG. 12, and may instead be controlled in consideration of comprehensive motor efficiency, and so on, or such that strong magnetic flux is caused during deceleration, during which period motor magnetomotive force serves beneficial in current flowing, to obtain large torque for small current.

The gain controller GCON controls gain of a velocity control loop to compensate variation in velocity control sensitivity due to variation, in proportion to the magnitude of a field, of a torque constant of a synchronous motor. Specifically, the gain controller GCON determines an appropriate gain based on the value of a field current command IDC, and outputs an amplitude signal IQC of a torque current.

A current addition means IAD performs vector-addition using a torque current IQC and a field current command IDC, and outputs a current amplitude signal IAMP and a phase signal IPH. A three-phase current command means ICOM receives a current amplitude signal IAMP, a phase signal IPH, and a rotation position POSD of a synchronous motor, and outputs three phase current commands IUC, IVC, IWC.

A power amplifier AMP supplies three-phase current IU, IV, IW to the synchronous motor. As described above, velocity control with a synchronous motor can be achieved through the control described above relating to FIG. 11. It should be noted that the above velocity control can be carried out in various modified methods, such as methods in which a current is controlled through d-q axis control, in which acceleration feed forward is additionally considered, in which voltage feed forward is additionally considered, and in which various observers are additionally considered.

It has been described, referring to FIGS. 7, 9, 10, that a synchronous motor of the present invention is superior in power factor, efficiency, and flux-weakening control in a high speed rotation region. However, the synchronous motor has a problem in view of torque ripple. That is, torque ripple due to disturbance in magnetic flux distribution in the respective magnetic poles will increase. Generally, a synchronous motor and current and voltage control therefor are designed and applied based on three-phase AC theory. That is, when magnetic flux distribution in each magnetic pole and a three-phase current both present sine waves, torque ripples are small enough to achieve favorable control, so that the synchronous motor can produce preferable torque and power. On the other hand, when the magnetic flux distribution and the threephase current in the respective magnetic poles contain large harmonic components, a large torque ripple is unfavorably caused. In a synchronous motor of the present invention, the middle portion 48 in the respective portions 46, 47, 48, constituting a N pole, is excited into inverted polarity in a flux-weakening region, as shown in FIG. 10. The resultant magnetic flux distribution in the N pole as entirely is far away from a sine wave distribution, as it contains large harmonic components. With such distribution, generally, large torque ripple will be caused even when the q-axis current iq, or a torque current, is controlled using a sine wave with very small harmonic components contained.

In order to address the torque ripple problem, the present invention proposes a method for erasing a torque ripple component having a cycle equal to or larger than a stator slot pitch to thereby reduce a torque ripple, and a method for erasing a torque ripple component having a cycle equal to or smaller than a stator slot pitch to thereby reduce a torque ripple. These methods will be described as follows in order.

A method for reducing a torque ripple component having a cycle equal to or larger than a stator slot pitch will be initially described.

Figure 13:
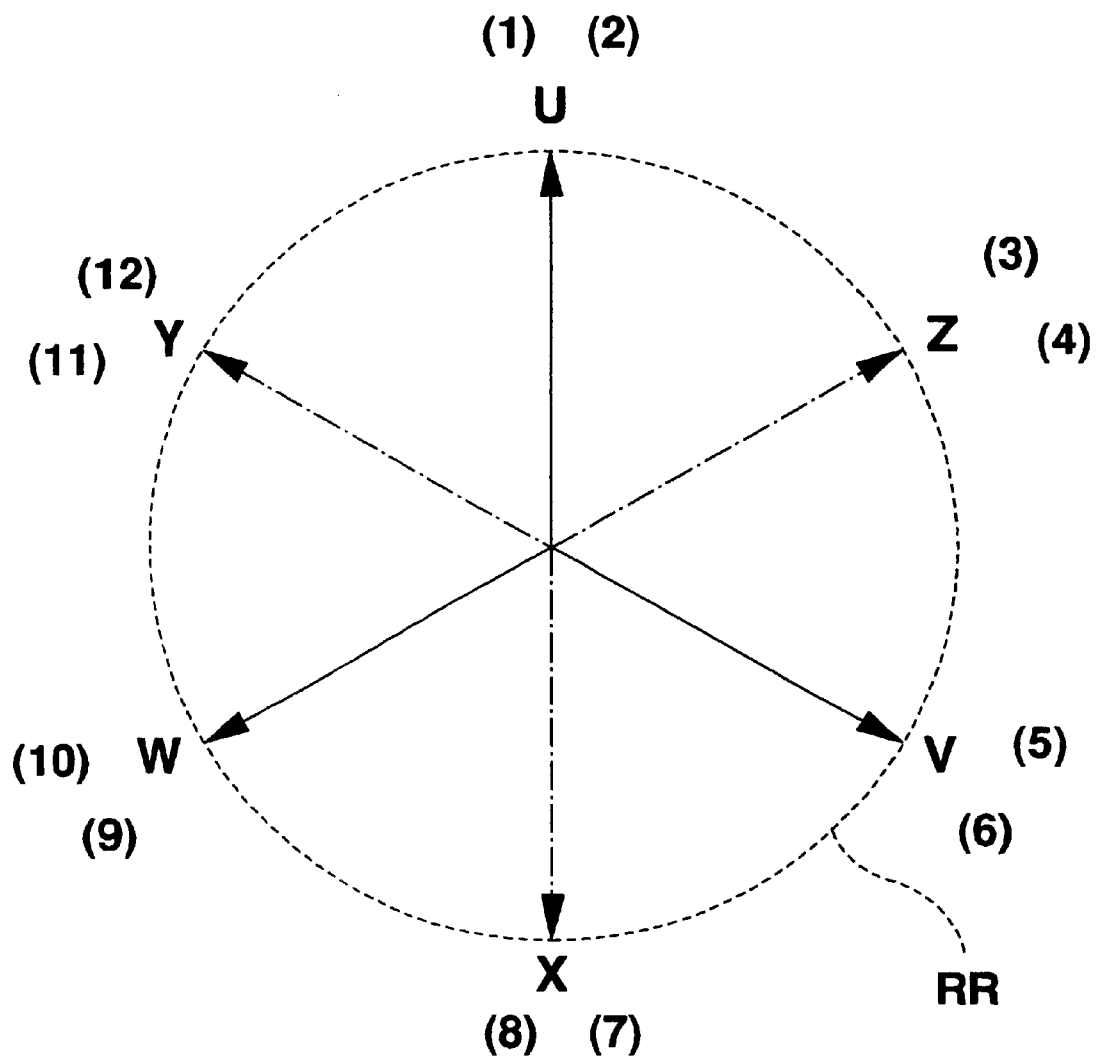
FIG. 13 is a vector diagram of current supplied to each slot of a stator wounded by the winding of FIG. 8.

As mentioned above, FIG. 8 shows an example of a full pitch winding for a three-phase six-pole motor. Here, provide that a three-phase AC is supplied to the respective three-phase windings. Currents which flow in the windings passing through the respective slots are expressed using current vectors, as shown in FIG. 13. In FIG. 13, three phases are respectively denoted as U, V, W, inversion phases thereof are respectively denoted as X, Y, Z, respective slots are numbered as (1), (2) . . . , and the amplitude of a current vector for each slot is shown as RR. As shown, six current vectors are discretely provided within an electric angle 360° to drive the motor. Because of the discrete arrangement, harmonic components are contained. Therefore, in actuality, the motor is preferably driven using a current vector of multi-phases with smaller harmonic components.

Figure 14:
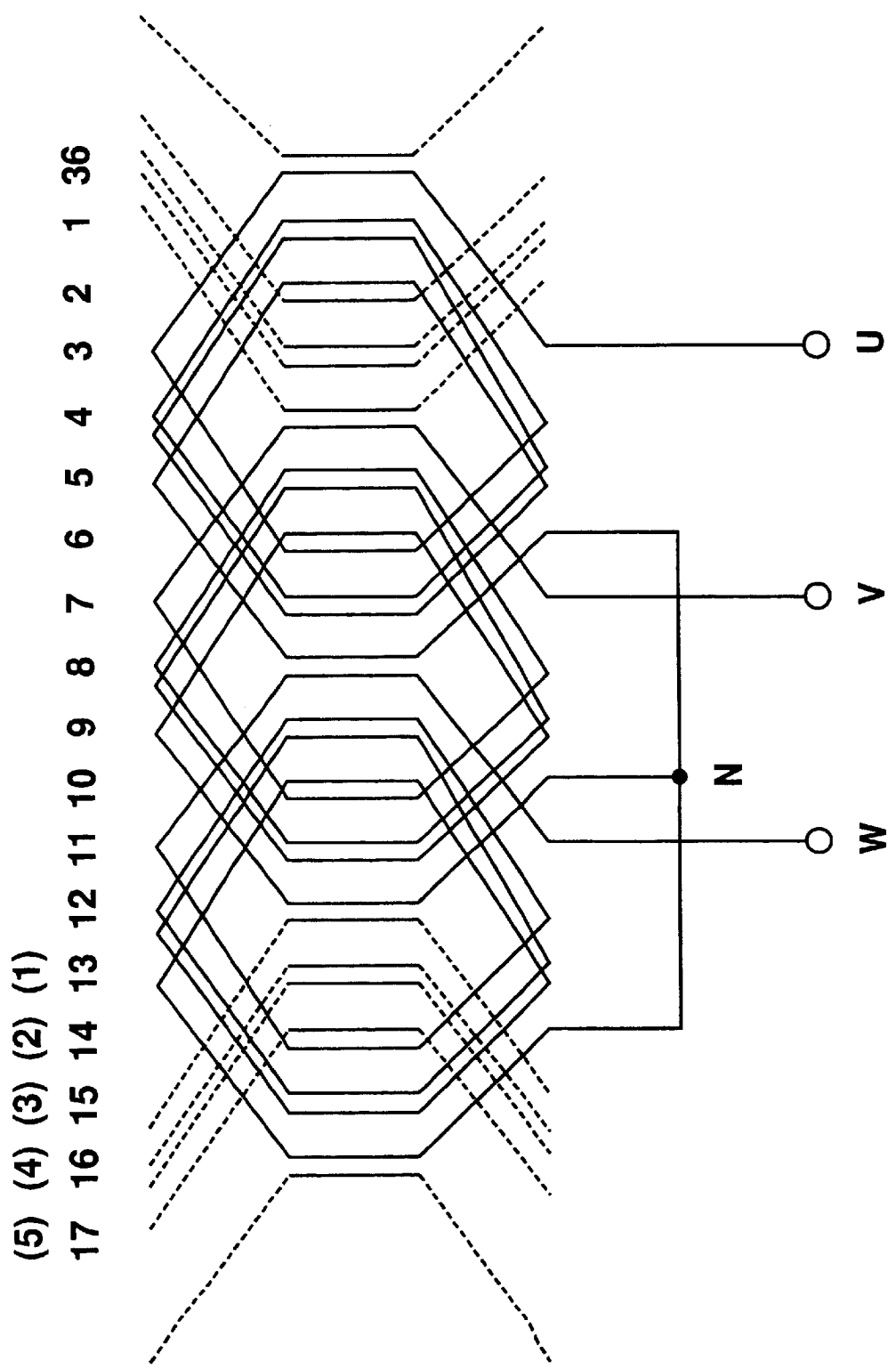
FIG. 14 is a diagram showing an example of a short pitch winding for a synchronous motor.

FIG. 14 shows an example of a short pitch winding. Current vectors relative to the respective slots are shown by the solid lines in FIG. 15. For example, a U-phase winding and a Z-phase winding pass through the slot (2) to wind around associated teeth of the stator such that the U-phase winding passes through the slot (2) half as many times as that at which the U-phase winding passes through the slot (1), and the Z-phase winding passes through the slot (3) half as many times as that at which the Z-phase winding passes through the slot (3). Thus, current vectors relative to the U-phase and the Z-phase windings passing through the slot (2) are expressed as U/2, Z/2, respectively, with amplitude SS=RR/2, and added up to a current vector UZS, whose amplitude is RS=COS 30° ×RR=0.866×RR. That is, the amplitude of the current vector UZS is smaller than that of the U-phase current vector for the slot (1). Windings for the respective phases similarly pass through the other slots. As a result, electric vectors of twelve phases are provided within an electric angle 360° of the motor. The amplitude of a current vector for each slot is smaller for every other slot. Note that, despite an increase of the number of phases from six to twelve, compared to FIG. 8, harmonic components relating to a difference in current amplitude are still contained. In order to address the problem, the number of times at which the U-phase and Z-phase windings pass through the slot (2) is increased by 1/COS 30°=1.555 so that the amplitude of the current vector for the slot (2) becomes equal to that for the slot (1) without changing the phase thereof. Similarly, the number of times at which the respective windings pass through the slots (4), (6), (8), (10), and (12) are increased by 1.155 times. With this arrangement, current vectors of twelve phases having the same amplitude can be provided at equal intervals of 30° within an electrical angle 360°, realizing magnetomotive force distribution containing reduced harmonic components. Note that it is practicable to set a wider width for a slot where a winding passes more number of times for other slots, as shown by the broken line in FIG. 7. As described above, current vectors for the respective slots are adjusted such that each has a phase suitable for the phase angle of each slot and that they all have the same amplitude. According to the above method, there can be provided an ideal magnetomotive force distribution except that current vectors are discretely arranged in twelve positions. As described above, as each magnetic pole of the rotor has the same shape, and the number of magnetic poles of the rotor is six, provided that each magnetic pole of the rotor is arranged for every mechanical angle of exact 60°, no torque ripple component with a cycle equal to or larger than the slot pitch of the stator is generated whatever shape of the rotor.

Current vectors having the same amplitude and phase as those of the current vector formed by the winding passing through the slot (2) as described above can be formed through countless number of combinations using windings with respective U, V, W, X, Y, Z, phases, those combinations all being covered in the scope of the present invention. The above is merely an example of the simplest combination.

Figure 15:
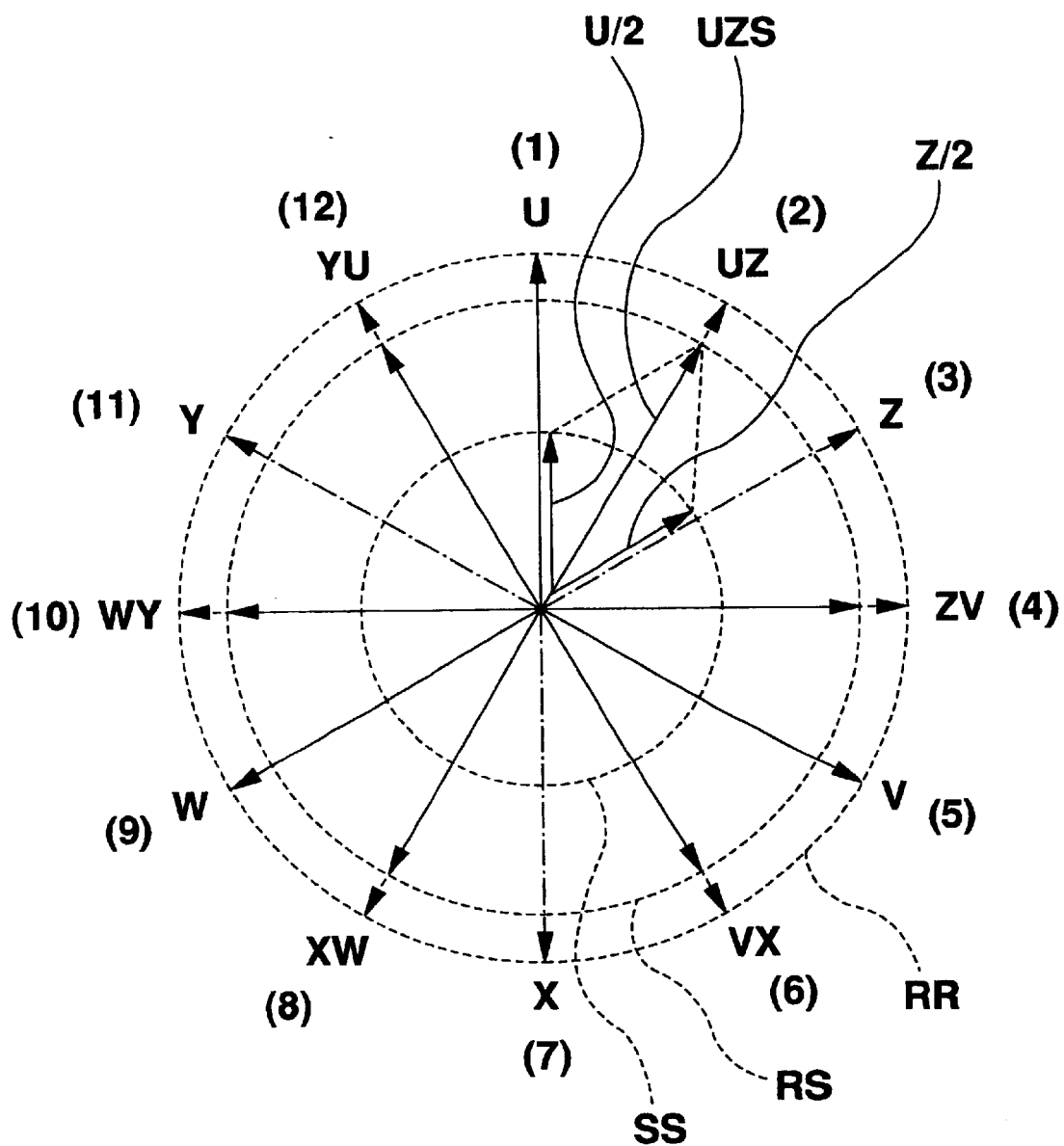
FIG. 15 is a vector diagram of current supplied to each slot of a stator wounded by the winding of FIG. 14.

In the case of a three-phase four-pole motor having 36 slots, the number of slots for every two poles, i.e., 18, is larger than that for the six-pole motor of FIG. 15, i.e., 12. With such a motor, current vectors may also be added such that each resultant vector has a phase suitable for its position within an electric angle 360° and that all vectors have the same amplitude for all slots. Countless number of combinations are available as to the number of times at which windings pass through the respective slots, as described above.

Figure 16:
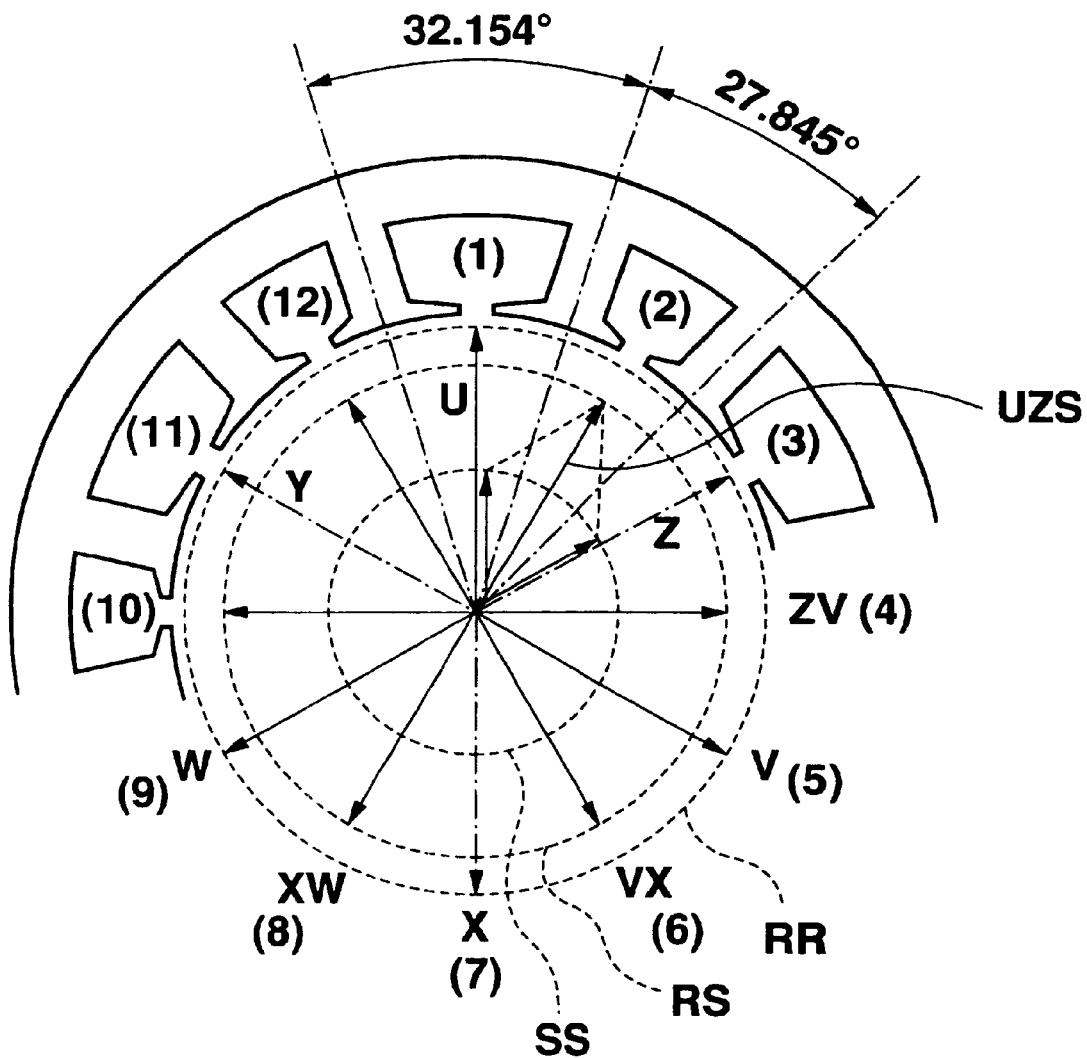
FIG. 16 is a diagram for explaining major elements of a stator structure of a synchronous motor according to the present invention.

Referring to FIG. 16, next described will be another method for reducing torque ripple caused with a short pitch winding of FIG. 14 when current vectors for the respective slots have different amplitudes. As shown in FIG. 15, the amplitude RS of the current vector UZS is COS 30°=0.866 time as large as the amplitude RR of the current vector U. Therefore, provided that the relevant teeth of the stator are formed at intervals 1:0.866=32.854°:27.845°, as shown in FIG. 16, current density for the respective slots are resultantly equivalent, or constant, to one another. As described above, by varying an interval between teeth of the stator, torque ripple due to inconsistent amplitudes of current vectors can be reduced. Note that, although the cross sections of the slots (1) and (2) appear different in FIG. 16 because of the illustration with easily recognizable center lines, respective slots can be easily formed to have constant cross sections by properly changing the position of the middle portion of the relevant teeth while leaving unchanged the position of the tooth portion forming the inner circumference of the stator.

The above methods referring to FIGS. 15 and 16 may be applied to stators of various shapes, which are all included in the scope of the present invention. For example, in the case of a stator of a slot-less structure, in which a winding passes through a space formed between the stator core and the rotor, respective windings for the stator may be arranged within the rotation angle which is determined proportional to the amplitude of an associated current vector. Specifically, referring to FIG. 16, the U-phase winding, which passes through the slot (1) in FIG. 16, may instead be arranged uniformly within a rotation angle of 32.154°, while the UZS winding, which passes through the slot (2), where an electric vector with smaller amplitude is formed, may be arranged uniformly within a rotation angle of 27.845°. Other windings may be provided similarly.

Next, a method for reducing torque ripple component with a cycle equal to or smaller than a stator slot pitch, will be described.

Generally, the respective magnetic poles cause relatively equal torque between themselves and the stator, and the torque for these poles contain equivalent torque ripple components with a cycle equal to or smaller than a slot pitch. Therefore, lower-order torque ripple harmonic components of these torque ripple components can be canceled for reduction when the respective magnetic poles of the rotor are shifted uniformly in the rotor rotation direction by an extent within the slot pitch range.

Figure 17:
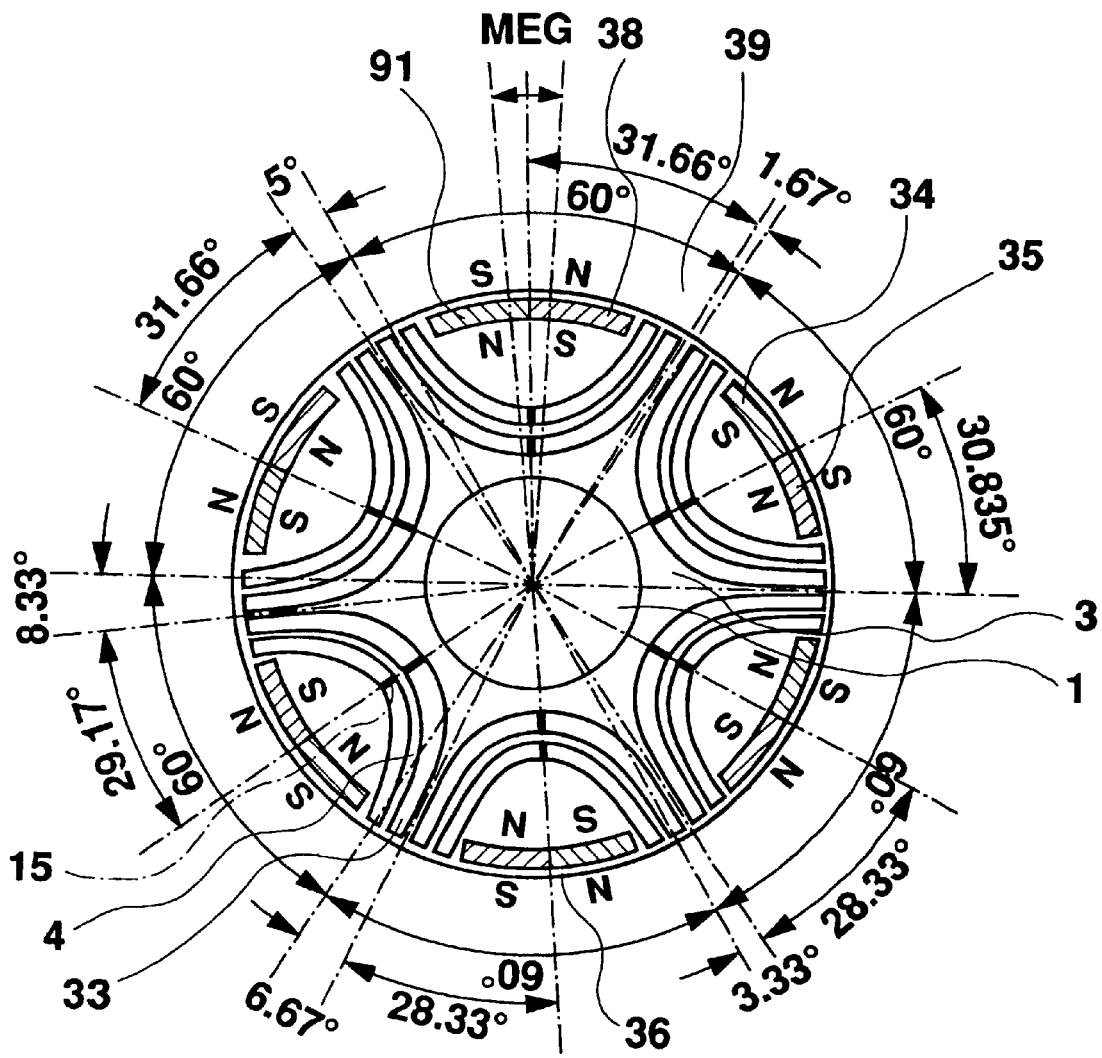
FIG. 17 is a diagram for explaining major elements of a rotor structure of a synchronous motor according to the present invention.

FIG. 17 shows an example of a rotor according to the present invention, including a rotor shaft 1, a rotor steel plate 3 provided in the vicinity of the rotor shaft 1, a magnetic flux path 4 for passing magnetic flux, space or non-magnetic member 33, and a link 15 for fixedly connecting the magnetic flux path 4, or the like, to the rotor steel plate 3. The link 15 is not only unnecessary, but also even harmful in view of electromagnetic operation of the motor. Nevertheless, the link 15 is effective at increasing rotor strength. The external circumference 36 of the rotor is connected, (reinforced) by an electromagnetic steel plate, which is also effective at increasing rotor strength. Note that the link 15 and the rotor external circumference 36 may be omitted when motor property should be considered with priority. Also note that, in view of rotor strength, adhesive agent or other fixing methods may be applied instead.

Also, in a rotor which is strong enough due to the existence of a rotor external circumference portion 36, or the like, slit-like portion 33 may be filled with non-magnetic member so that a thin magnetic flux path 4 can be further rigidly fixed. The resultant rotor structure is tolerant enough against centrifugal force in high speed rotation. Permanent magnets 34, 35, 39, and so on are provided.

In the drawing, the rotor center line for every 60° is shown by the one dot chain line. The centers of the respective magnetic poles of the rotor are displaced from the respective center lines by 0°, 1.67°, 5°, 8.33°, 6.67°, and 3.33°. The rotor is designed for use with three-phase and six-pole stator having 36 slots, shown in FIG. 7, and the respective magnetic poles formed in the rotor are shifted by (1 stator slot pitch 10°/6 poles)=1.67 in the rotor rotation direction.

Boundary portions between adjacent magnetic poles, though not clearly distinct, may correspond to an angled area MEG defined by the dotted lines in FIG. 17. The angle MEG may depend on the boundaries between magnetic poles. The angled area MEG, or boundary portion, is excluded from an effective area of each magnetic pole. In a torque ripple reduction method relating to the structure of FIG. 17, respective magnetic poles of the rotor, each having the same shape, are shifted by the above mentioned angles in the rotor rotation direction so that torque ripples caused by the respective magnetic poles are canceled for reduction as entirety. However, the shape of each magnetic pole of the embodiment of FIG. 17 is indefinite due to the presence of indefinite boundary portion. For example, provide that angular width of each magnetic pole is 40°. In the N pole including the magnetic poles 34, 38, and the magnetic pole portion 39 of soft magnetic pole, an angle defined by the center line of the associated magnetic pole and the boundary between the magnetic pole and that to the left is 31.66°. In this case, the right half angle of the angled area MEG, or MEG/2, is (31.66-40/20)=11.66°. The left half angle, of the angled area MEG can be similarly calculated as 11.6°. The width for each boundary portion can similarly be calculated. The boundary portion MEG is defined symmetrical with respect to the boundary line. Thus, it can be said that the boundary portion MEG is an area where N and S permanent magnets are symmetrically provided with respect to the boundary in addition to the associated magnetic poles. Therefore, boundary portion MEG is not necessary in view of torque ripple. However, boundary portion MEG is not removed because the influence thereof is small and manufacturing of a rotor without boundary portions is difficult. Alternatively, a concave boundary portion MEG may be formed so that it would serve as if it did not magnetically exist, an example of which may be shown later in FIG. 23.

With an arrangement of FIG. 17, electrical function by the respective magnetic poles of the rotor and the stator are shifted by the above mentioned shift angles in the rotor rotation direction until torque ripple with a cycle equal to or smaller than one stator slot pitch cycle is finally canceled whereby torque ripple is reduced. Specifically, it can be geometrically and easily understood that torque ripple with one slot cycle, ½ slot cycle, and ⅓ slot cycle are cancelled. Note that torque ripple components with a cycle larger than a slot pitch can be reduced using an improved winding method, as described above.

Figure 18:
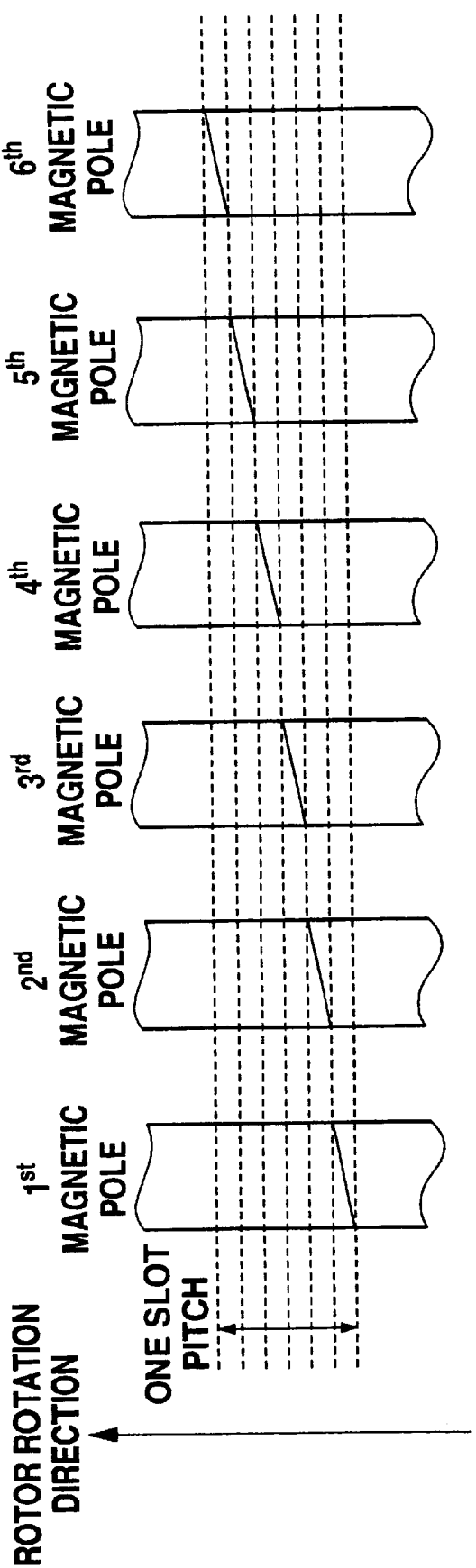
FIG. 18 is a diagram for explaining a skewed rotor structure of a synchronous motor according to the present invention.

Remaining harmonic torque ripple components with a cycle of ⅓ slot pitch or a smaller pitch can be reduced by relatively skewing the rotor and the stator by an angle corresponding to a cycle of the lowest order harmonic component in the remaining harmonic torque ripple components. Specifically, when the rotor of FIG. 17 is skewed by ⅙ slot pitch to thereby shift the respective magnetic poles from their original positions by 0°, 1.67°, 3.33°, 5°, 6.67°, and 8.330 , respectively, and parts of the center lines passing through the circumferential portion of the respective magnetic poles are taken out to be aligned, they would be presented as shown in FIG. 18. As shown, as a result of shifting, each by ⅙ slot pitch, of the respective magnetic poles, one slot pitch has been geometrically skewed when it goes around the entire circumference. Therefore, torque ripple component with a cycle equal to or smaller than one slot pitch has been removed.

It is known that, in the case of a large skew angle, magnetic flux component in the rotor shaft direction will be caused in the inside of the rotor, as a result of which skewing effect is reduced. Here, however, skewing by ⅙ slot pitch only, as above, will not cause such magnetic flux components in the inside of the rotor, and preferable torque ripple reduction can be achieved.

Various combinations for arrangements of shift angels for the magnetic poles in the rotor rotation direction are available. Torque ripples may be reduced using a simpler magnetic-pole shifting method than that is described referring to FIG. 17, in which magnetic poles may be shifted by angles of 0°, 50°, 0°, 5°, 0°, 5°, or by angles of 0°, -3.33°, 3.33°, 0°, -3.33°, 3.33°, instead of by angles of 0°, 1.67°, 5°, 8.33°, 6.67°, 3.33° in FIG. 17. With any combination, torque ripple components can be reduced, though reduced torque ripple components depend on the combination.

Besides the torque ripple reduction method described referring to FIG. 17, equivalent advantage can be achieved by a method in which a rotor including magnetic poles equidistantly arranged in the circumferential direction is divided into a plurality of blocks in the rotor shaft direction, and each block is relatively shifted in the rotor rotation direction by an extent described above. Specifically, provide that a rotor is divided into two blocks in the rotor shaft direction, and the magnetic poles of the respective blocks are shifted by 0° and 5°, respectively, in the rotor rotation direction. With this arrangement, torque ripple components caused by the respective blocks are canceled as the entirely of the rotor, achieving toque ripple reduction. Further, a magnetic insulating layer may be preferably provided between the blocks to reduce magnetic fluxes coming in or out between the blocks. Additional skewing of the rotor may enable further reduction of the torque ripple. Note that the teeth of the stator or both of the rotor and the stator may be shifted instead of the magnetic poles of the rotor only as described above, as the shift angle is relative between the rotor and the stator.

Figure 2:
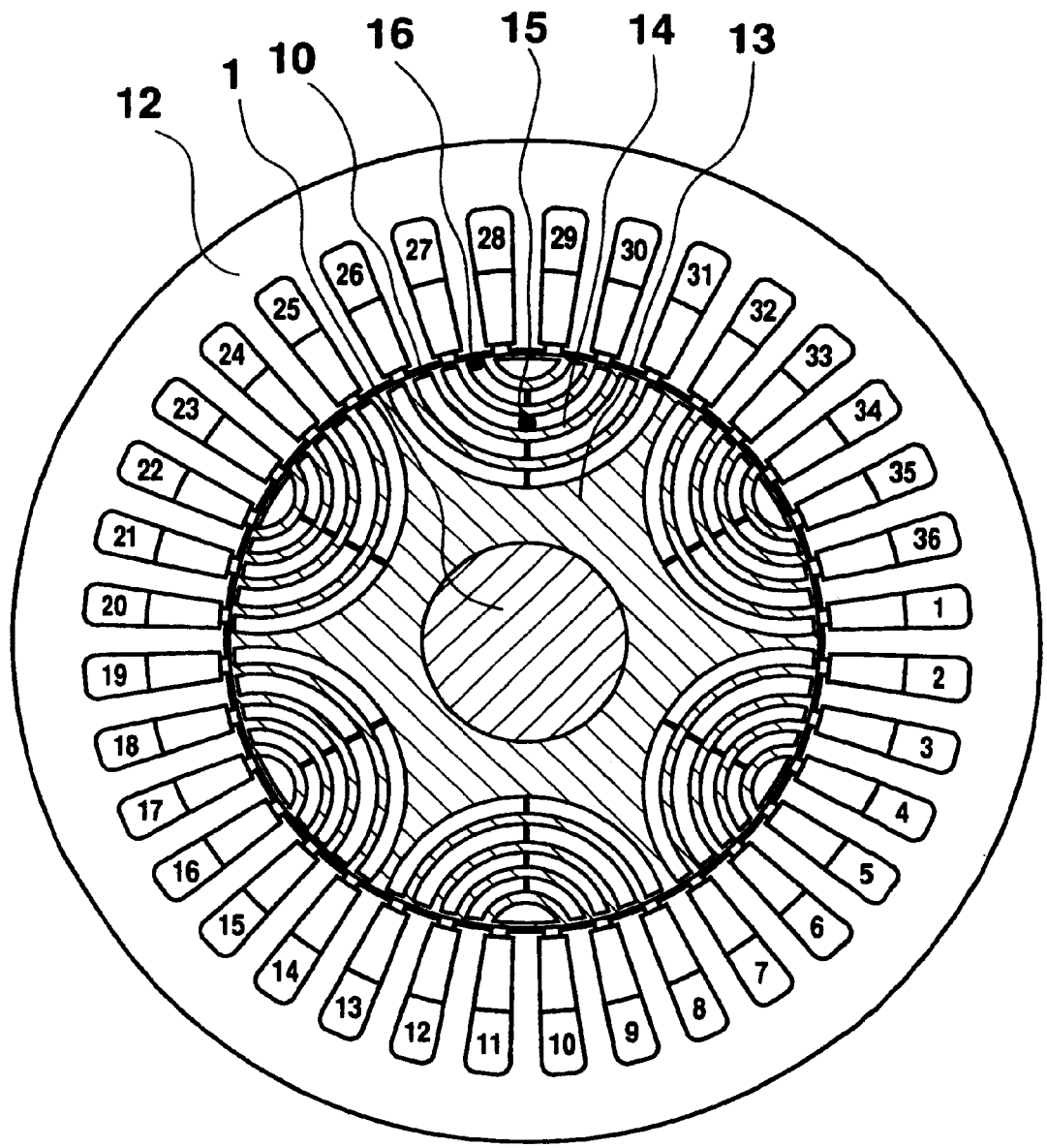
FIG. 2 is a cross sectional diagram showing major elements of an example of a conventional synchronous reluctance motor.

The synchronous motor of FIG. 17 has a structure in which permanent magnets 34, 35 and so on are provided at the boundaries between magnetic poles so that magnetic fluxes of the respective magnetic poles may less easily change their positions than those in the synchronous reluctance motor of FIG. 2. This arrangement allows formation for a wider link for the rotor external circumferential portion for improved rotor strength. The resultant rotor attains strength for being driven at high speed rotation.

Figure 19:
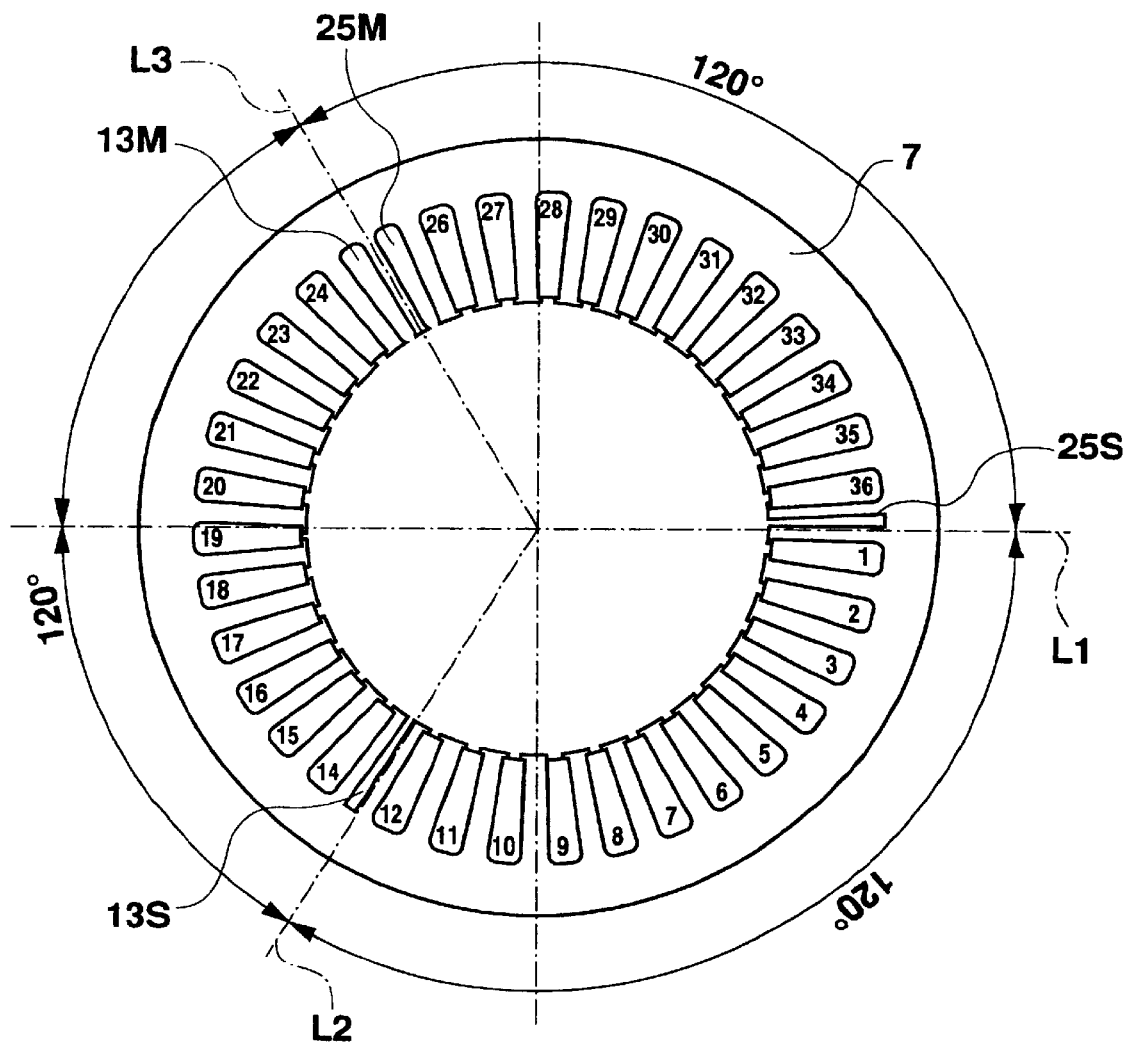
FIG. 19 is a diagram for explaining major elements of a stator structure of a synchronous motor according to the present invention.

Another method for reducing torque ripple with a cycle equal to or smaller than a slot cycle through modification of a stator structure will be described referring to FIG. 19. In the following, a three-phase six-pole stator having 36 slots, such as is shown in FIG. 19, will be referred to. With this rotor, the respective magnetic poles are equidistantly arranged, rather than being partly shifted in the rotor rotation direction, as shown in FIG. 17. The slots 1 to 12 are identical to the conventional teeth in FIGS. 7 and 15, in which the angle 120° between the slots 1 and 12 corresponds to an electric angle 360° serving as one functional motor unit. Slots 14 through 24 in a stator portion corresponding to a mechanical angle 120° between the center lines L2 and L3 are shifted counterclockwise by 6.66°, which corresponds to ⅔ of one slot pitch. In addition, slots 13S and 13M are arranged apart from each other by a mechanical angle of about 120°, i.e., an electric angle of about 360°, so that they resultantly serve as if they were arranged side by side.

As described above, the separation of the slot 13 into slots 13S and 13M results in functional change of the motor similar to that described referring to FIG. 16. That is, when a current is supplied with respect to a certain angle, which is suitable for the width of the angle, current density (a current amount/angle) for the angle remains the same, and the operation of the motor (as entirety) can be recognized as substantially equivalent between before and after the current supply. Slot arrangement between the center lines L2 and L3 may be understood as a mixture of parts of slot arrangements for a three-phase six-pole motor having 72 slots and for a three-phase and six-poles motor having 108 slots.

Further, slots 26 through 36 in the portion of a mechanical angle 120° between the center lines L3 and L1 are shifted counterclockwise by 3.33°, which corresponds to ⅓ of one slot pitch. Slot 25 is divided into a slot 25M, corresponding to ⅔ of the slot 25, and a slot 25S, corresponding to ⅓ thereof. Slots 25S and 25M are arranged apart from each other by a mechanical angle of about 120°, i.e., an electric angle of about 360°, so that they resultantly serve as if they were arranged side by side. With the thus structured motor as shown in FIG. 19, torque ripples caused by each stator block of 120° will be mutually cancelled whereby torque ripple in the motor as entirety can be cancelled. In addition, because the number of slots discretely provided is virtually increased to 36×3=108, torque ripple due to discrete arrangement of the slots can also be reduced.

To be strict, each slot should be supplied with a current having a phase determined according to each slot position. That is, since slots other than those in the 120° portion between the center lines LI and L2 are shifted by 6.66° and 33.3°, respectively, the number of times at which windings for the respective three phases pass through each of these other slots must be determined based on the principle described referring to FIG. 15. Specifically, windings for the respective three phases must be arranged passing through the respective slots such that a current with the following phases is supplied to the following slots, i.e., a current as shown in FIG. 15 to the slots 1 through 12; a current with phases differing from that for the slot 1 by (3.33°×3) to the slots 13S; a current having phases differing from that for the slots 1 through 11 by (−3.33°×3) to the slots 14 through 24; a current with phases differing from that for the slot 12 by (−1.66°×3) to the slot 13M; a current with phases differing from that for the slot 1 by (1.66°×3) to the slot 25M; a current with phases differing from that for the slots 1 through 11 by (−6.66°×3) to the slots 26 through 36; and a current with phases differing from that for the slot 12 by (−3.33°×3) to the slot 25S. Current with the respective phases can be generated through addition of unit vectors of the three phase currents, as described referring to FIG. 15. The number of times at which windings for the three phases winds around the respective teeth adjacent to the slots may be determined through calculation. Theoretically, there are a number of methods available for formation of respective current vectors, as described above. In actual, however, a winding can pass through each slot at only some limited number of times, such as some twenty times. In this view, a number of winding times may be selected which is close to an ideal value and convenient in view of winding operation.

The above can be applied to the rotor shaft direction. Specifically, a typical symmetrical stator, such as is shown in FIG. 2, is divided in the rotor shaft direction into a plurality of NSB blocks, and the respective blocks are shifted by a slot pitch/SNB in the rotation direction. Then, a current with a phase determined based on the respective slot positions is supplied to the respective windings passing through the respective slots, as described above. As a result, torque ripple components due to discrete arrangement of the slots in the respective blocks are cancelled as entirety of the motor so that torque ripple can be reduced.

An alternative effective method would be such that a magnetic insulating layer may be provided between respective blocks so that magnetic flux does not come in or out between the blocks in the shaft direction to achieve sufficient torque ripple reduction. Skewing is also effective in torque ripple reduction. Note that the rotor or both of the rotor and the stator may be shifted in the above methods, instead of shifting only the stator, as the shift angle is relative between the rotor and the stator. Further, windings with respective phases should be arranged such that current vectors suitable for the respective slot positions in the rotation direction can be provided.

Next, a method for solving a problem with the link 15 will be described with reference to FIGS. 20, 21, and 22. A thicker link 15 is desired for increasing rotor strength. However, in proportion to the thickness of the link 15, leakage magnetic flux due to the magnetomotive force by the q-axis current will increase in the q-axis direction, resulting in deteriorated torque, power factor, and efficiency. In particular, torque reduction phenomenon in flux-weakening control, or other unfavorable phenomena will be caused. That is, the thickness of the link 15 has trade-off relationship with deterioration of motor property due to rotor strength and leakage magnetic flux in the q-axis direction.

Figure 20:
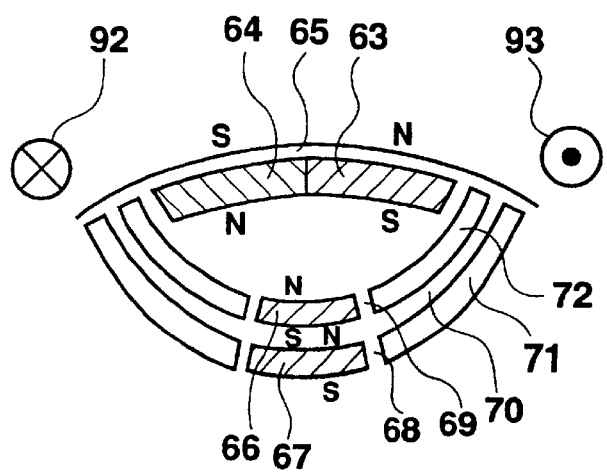
FIG. 20 is a diagram for explaining major elements of a rotor structure of a synchronous motor according to the present invention.

FIG. 20 shows a part in the vicinity of magnetic pole boundary, of a rotor of the present invention, including a permanent magnet 63 for a N magnetic pole, a permanent magnet 64 for an S magnetic pole adjacent to the N magnetic pole, a rotor external circumferential portion 65 for reinforcing rotor strength, space or magnetic insulating member 71, 72 for reducing magnetic flux in the q-axis direction, a magnetic flux path 70 for passing magnetic flux in the d-axis direction, links 68, 69 for strengthening the rotor in the q-axis direction, and modeled q-axis current 92, 93 to be supplied to the stator. Note that d-axis current to be supplied to the stator is omitted. Permanent magnets 66, 67 are arranged having polarity opposite from the direction of the magnetomotive force of the q-axis current 92, 93, and form magnetic flux toward the inks 68, 69 from up to down in view of the drawing to magnetically saturate the links 68, 69 to therewith reduce leakage magnetic flux in the q-axis direction due to the q-axis current. The permanent magnets 66, 67 compensate leakage magnetic flux in the q-axis direction in the space 71 so as to flow in the opposite direction, and leakage magnetic flux in the q-axis direction along the rotor external circumference 65 so as to flow in the opposite direction. The structure of FIG. 20 is effective when the q-axis current is supplied in the direction shown in FIG. 20, and thus preferably used in a motor which requires only mono-directional rotation torque.

Figure 21:
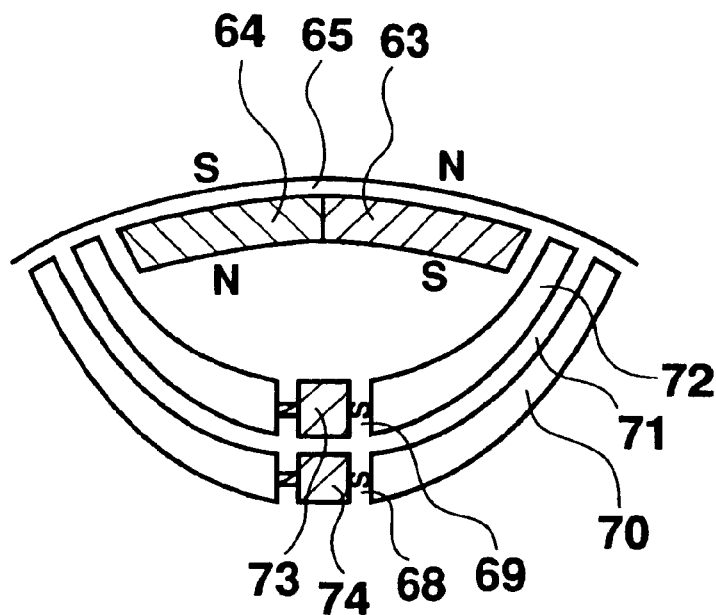
FIG. 21 is a diagram for explaining major elements of a rotor structure of a synchronous motor according to the present invention.

In the structure shown in FIG. 21, permanent magnets 73, 74 are arranged such that their magnetic directions differ by 90° to each other. This structure is able to reduce leakage magnetic flux in the q-axis direction through magnetic saturation with the links 68, 69.

Figure 22:
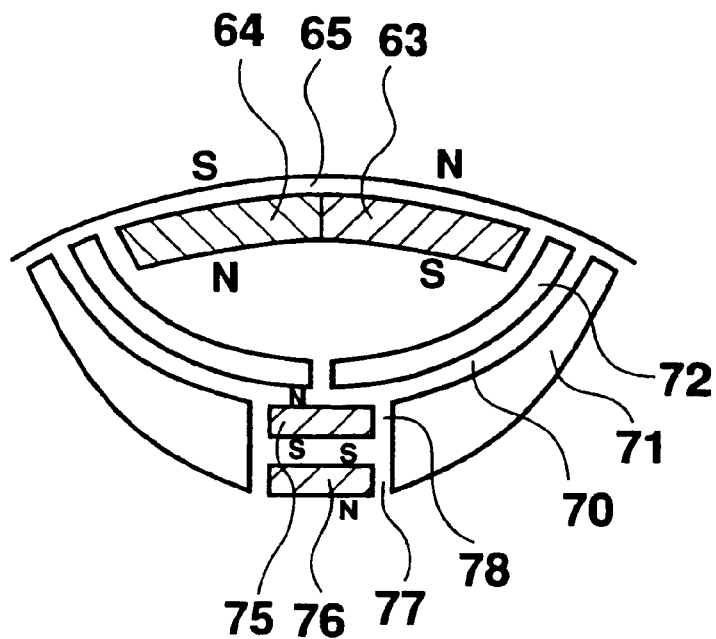
FIG. 22 is a diagram for explaining major elements of a rotor structure of a synchronous motor according to the present invention.

In the structure shown in FIGS. 22, links 77, 78 are arranged in parallel to each other, and permanent magnets 76, 76 are arranged such that their magnetic directions are opposite from each other. This structure is able to reduce leakage magnetic flux in the q-axis direction when the q-axis current is either positive or negative.

Figure 23:
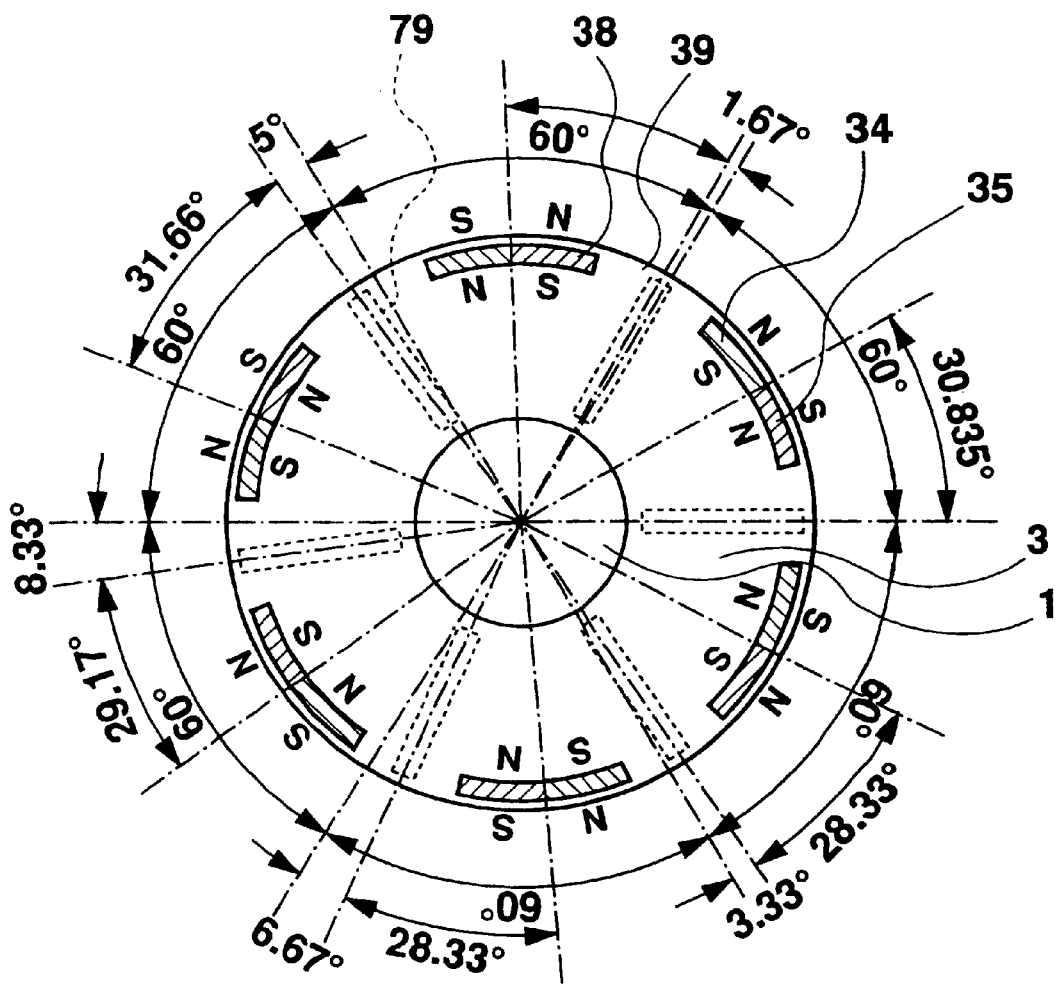
FIG. 23 is a diagram for explaining major elements of a rotor structure of a synchronous motor according to the present invention.

FIG. 23 shows an example of a rotor for a synchronous motor according to the present invention, including a space or magnetic insulating member 79. The space or magnetic insulating member 79 is provided for reduction of magnetomotive force of the q-axis current acting on the magnetic pole 39 of the soft magnetic member, i.e., motor reaction. A rotor shaft 1 made of non-magnetic steel, such as stainless, would be more effective. The space 79 has a simpler shape compared to the corresponding in FIG. 17. Specifically, some magnetic flux paths in the q-axis direction are formed on the external and bore sides of the space 79, and some magnetic fluxes in the q-axis direction are caused in these parts due to the magnetomotive force of the q-axis current. However, magnetic flux distribution in the magnetic poles 39 is less susceptible to the magnetomotive force due to the q-axis current, compared to a case without a space 79.

Figure 24:
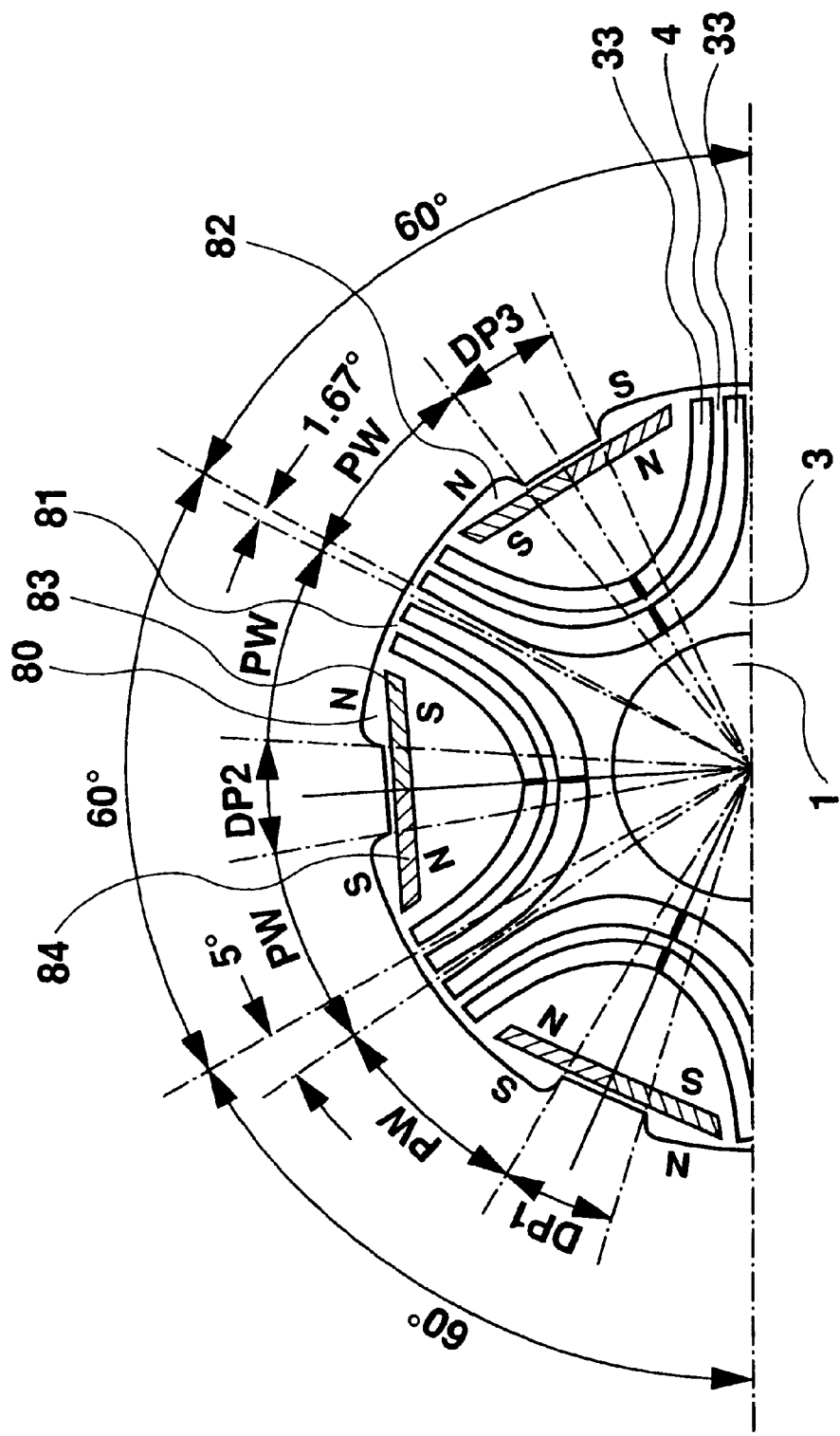
FIG. 24 is a diagram for explaining major elements of a rotor structure of a synchronous motor according to the present invention.

FIG. 24 shows another preferred embodiment of a rotor of a synchronous motor according to the present invention. The rotor differs from that of FIG. 17 in that the circumference of the magnetic poles is uneven with concave and convex. For example, magnetic pole portions 80, 81, 82 together constitute a N magnetic pole, whose outer shape is identical to that of an adjacent S magnetic pole. The magnetic pole portions 80, 82 are strongly excited particularly by the magnet 83 with N poles arranged radially outward, while magnetic pole portion 81, made of soft magnetic member, is excited by the d-axis current. A permanent magnet 84 is for a S magnetic pole. Magnetic pole width effective in torque generation is expressed roughly as an angle width of PW×2, and external shapes and widths of the respective N and S poles are substantially the same. Boundary portions between the respective magnetic poles, i.e., regions DP1, DP2, DP3 Ö have different widths.

For example, provided that effective width for each magnetic pole is PW×2=40°, DP2=60°−1.67°+5°−40°=23.33° and DP3=60°+1.67° −40°=21.67°. Each boundary portion between magnetic poles is positioned at the middle between centers of adjacent magnetic pole centers.

As described above, magnetic poles, each having the same shape, are shifted by an integer multiple times of ⅙ of one stator slot pitch in the rotor rotation direction. As a result, torque ripples caused in the respective magnetic poles are cancelled as a whole, achieving torque ripple reduction.

Figure 5:
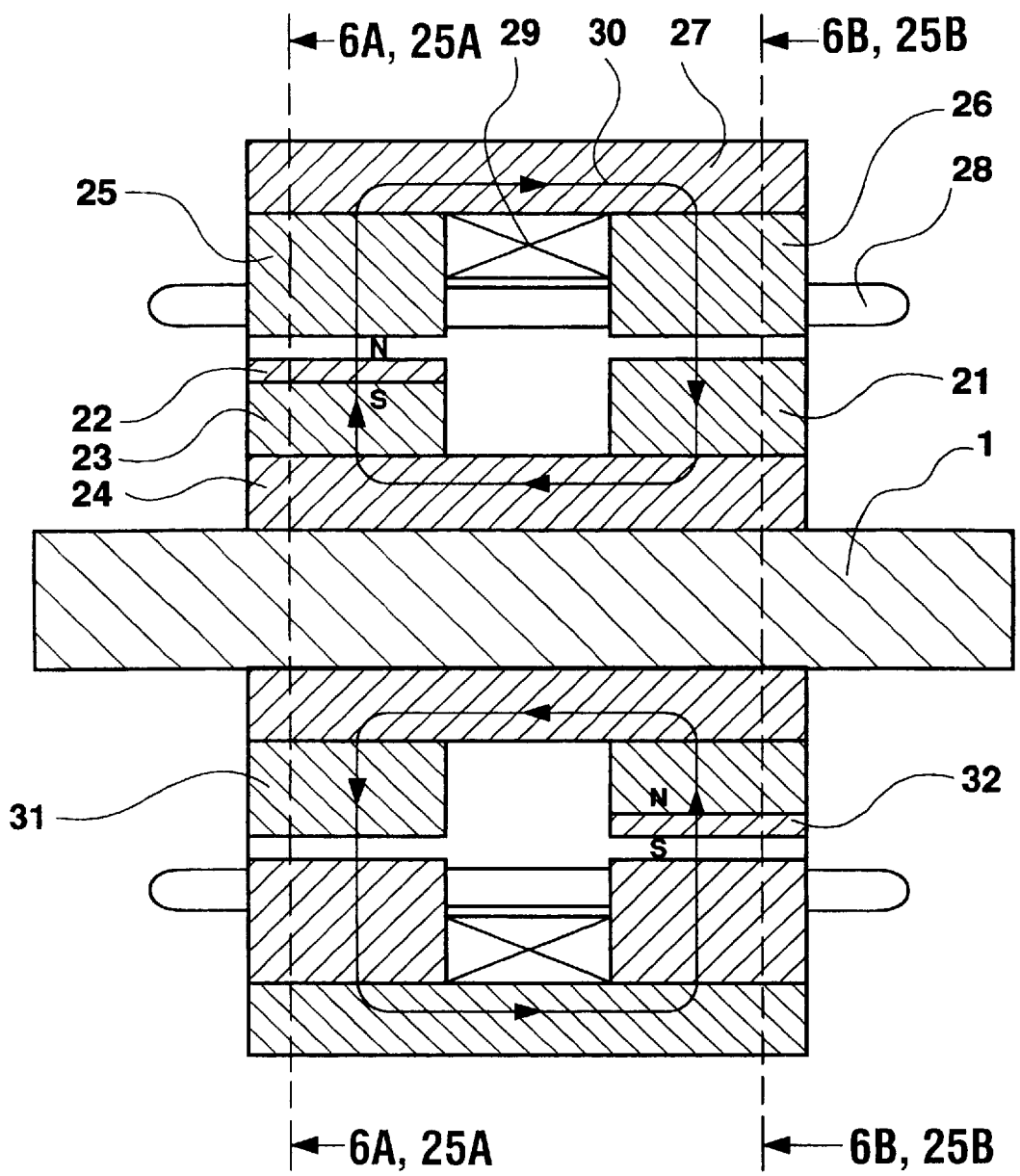
FIG. 5 is a diagram showing a conventional synchronous motor of hybrid type having a permanent magnet and a field winding.
Figures 6A, 6B:
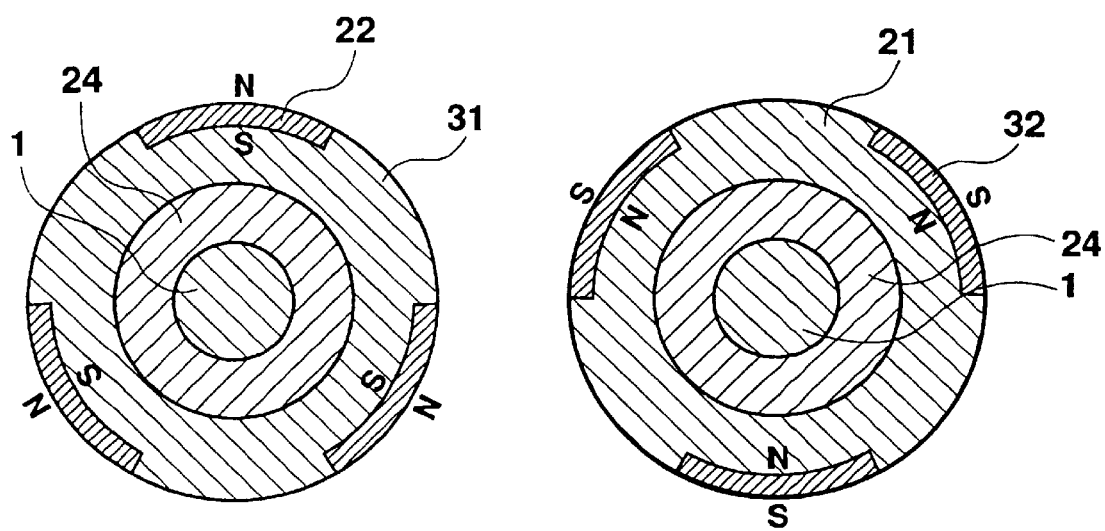
FIG. 6A is a cross sectional diagram showing a rotor of the synchronous motor of FIG. 5.
FIG. 6B is a cross sectional diagram showing a rotor of the synchronous motor of FIG. 5.

FIGS. 25A and 25B are cross sectional view showing a rotor of a synchronous motor free from the problem with the three-phase six-pole synchronous motor of hybrid type shown in FIG. 5. The stator is the same as that in FIG. 5. A difference between the rotor of these drawings and that in corresponding FIGS. 6A and 6B is that magnetic poles 31, made of soft magnetic member, are constituted of permanent magnets 85, 87 with S poles arranged radially outward and a magnetic pole 86 made of soft magnetic member, and that magnetic poles 21, made of soft magnetic pole, are constituted of permanent magnets 88, 90 with N poles arranged radially outward and a magnetic pole 89 of soft magnetic member in the former. An angular width for the permanent magnets 85, 87, 88, 90, and so on, are 20° in FIGS. 25A and 25B, but not limited thereto. With the above structure, variation in magnetic flux distribution in the magnetic poles 31, 21 of soft magnetic member due to the magnetomotive force of the q-axis current can be significantly reduced. Also, the magnetic poles 86, 89 of soft magnetic member are weakened or excited into opposite polarity by a field winding 29, whereby flux-weakening control can be achieved. Further, torque ripple components with the synchronous motor of FIGS. 25A and 25B can be reduced using the torque ripple reduction technique, described above. Note that the synchronous motor of FIGS. 25A and 25B can be easily realized, even though it has a more complicated structure than that shown in FIG. 7 and requires a field winding 29 and a control section therefor, because field control is independent. Particularly, the synchronous motor can realize a power generator system only through field control without provision of a three phase AC control device.

Note that the synchronous motor of the present invention can make a linear motor when linearly constructed.

A synchronous motor of the present invention can reduce magnetic flux variation in the q-axis direction due to the q-axis current. Thus, the motor can produce large torque output, and achieve properties superior in efficient factor and power factor. This enables a synchronous motor with size and cost reduced, and accordingly a driving device with size and cost reduced.

Also, as magnetic flux in the q-axis direction, as well as the q-axis inductance, is small, preferable flux-weakening control can be achieved. This enables a synchronous motor to rotate at high speed such as at base rotation frequency or higher frequency.

Further, application of the above torque ripple reduction technique could achieve properties with small torque ripples. This enables highly accurate control and driving with lower noise and small vibration. Also, as the external circumferential portion of the rotor can be easily reinforced, the rotor with such a reinforced external circumferential portion can be driven at higher rotation velocity. The synchronous motor as shown in FIG. 7 according to the present invention is preferable for use which requires a piercing hole formed on a rotor is necessary as a large piercing hole can be easily formed on the rotor.

A synchronous motor of a hybrid structure, using both field winding and a permanent magnet, can achieve field control through simple control because field control is independent. Therefore, the motor can realize a power generation system through only filed control without provision of a three phase AC control device.

What is claimed is:

1. A synchronous motor, comprising:
   a pair of permanent magnets;
   a first permanent magnet, having a North pole directed radially outward, arranged at one or more radial ends in a rotation direction of a North magnetic pole of a rotor;
   a second permanent magnet, having a South pole directed radially outward, and adjoining the first permanent magnet, arranged at one or more radial ends in a rotation direction of a South magnetic pole of the rotor;
   a magnetic pole portion made of soft magnetic member, arranged in a middle portion of the rotor in the rotation direction of the North magnetic pole of the rotor; and
   a magnetic pole portion made of soft magnetic member, arranged in a middle portion of the rotor in the rotation direction of the South pole magnetic pole of the rotor.

2. A synchronous motor according to claim 1, further comprising
   a stator having a plurality of teeth; and
   a plurality of windings winding around the respective plurality of teeth, being supplied with sine wave currents having respective phases and being supplied to the plurality of windings represented as a current vector,
   a phase of the current vector matches a position in a rotor rotation direction of an associated slot, and
   a number of the windings around the one or more teeth is decided such that the product of the number of windings times a sine wave current being supplied to the windings are the same with respect to all of the plurality of the teeth.

3. A synchronous motor according to claim 1, further comprising:
   a stator having a plurality of teeth around which are wound windings in a different number of times for every phase, and
   wherein
   an interval between adjacent teeth of the stator is determined substantially proportional to a current maximum value, which is a magnitude of a current vector caused by sine wave currents having respective phases when being supplied to the windings.

4. A synchronous motor according to claim 1, further comprising:
   a stator having a plurality of teeth, wherein
   the rotor includes magnetic poles whose two respective adjacent ends are shifted by different shift angles in the rotation direction.

5. A synchronous motor according to claim 1, wherein
   the rotor is virtually divided into function blocks for every electric angle, and wherein the synchronous motor further comprises a stator having a plurality of teeth so that windings wind around the circumference thereof,
   at least one of the plurality of teeth is divided, and
   the divided pieces of the tooth are arranged at both ends in the rotation direction of the function blocks at an interval of a multiple of the electric angle of the rotor.

6. A synchronous motor according to claim 1, further comprising
   a magnetic insulating section made of a space layer or a magnetic insulating member provided in a vicinity of the magnetic pole portion made of soft magnetic member.

7. A synchronous motor according to claim 1, further comprising
   a magnetic insulating portion made of a space layer or a magnetic insulating member provided between magnetic pole portions made of soft magnetic member,
   a link connected traversing the magnetic insulating portion, and
   a permanent magnet arranged in a vicinity of the link whereby the permanent magnet supplies magnetic flux to the link.

8. A synchronous motor according to claim 1, further comprising
   d-axis current control means for controlling a d-axis current, which is a magnetizing current for exciting a field, such that, at least when maximum torque control is carried out at respective rotation velocities VEL,
   the d-axis current becomes substantially constant with respect to rotation velocity from zero to base rotation frequency, and,
   the d-axis current becomes substantially equivalent to the ratio with respect to rotation velocity equal to or higher than the base rotation frequency, Kf1 being a constant unique to the synchronous motor and relating to a number of windings for the stator and to a field magnetic flux, KPF being a constant unique to the synchronous motor and to permanent magnets North (PMN) and South (PMS), whereby a velocity of the synchronous motor is controlled.

9. A synchronous motor having a pair of stators, a pair of rotors, and a field winding, wherein each rotor comprises
   a permanent magnet with a North pole arranged radially outward, provided for every electric angle of 360° in a rotation direction of a magnetic pole of the rotor,
   a permanent magnet with a South pole arranged radially outward, provided at an end in a rotation direction, of a South magnetic pole, and
   a magnetic pole potion made of soft magnetic member provided at a middle portion in the rotation direction, of the South magnetic pole, and
   a second rotor comprises
   a permanent magnet with a South pole arranged radially outward, provided at an end in the rotation direction, of a magnetic pole which is shifted by an electric angle 180° from the permanent magnet with a North pole arranged radially outward of each rotor,
   a permanent magnet with a North pole arranged radially outward, provided at an end in the rotation direction, of a North magnetic pole, and
   a magnetic pole portion made of soft magnetic member, provided at a middle portion in the rotation direction of the North magnetic pole.

* * * * *